United States Patent
Furuya

[19]

[11] Patent Number: 6,098,121
[45] Date of Patent: Aug. 1, 2000

[54] DATA TRANSFER APPARATUS WITH IMPROVED THROUGHPUT DUE TO REDUCED PROCESSING OVERHEAD IN INTERRUPT PROCESS

[75] Inventor: Shinji Furuya, Moriguchi, Japan

[73] Assignee: Matsushita Electric Industrial Co., Ltd., Osaka, Japan

[21] Appl. No.: 08/984,429

[22] Filed: Dec. 3, 1997

[30] Foreign Application Priority Data

Dec. 3, 1996 [JP] Japan ..................................... 8-322566

[51] Int. Cl.⁷ .................................................. G06F 13/12
[52] U.S. Cl. ................... 710/24; 710/6; 710/32
[58] Field of Search ............................ 712/1; 375/825; 711/111; 395/285, 481, 200.46, 425; 710/27, 5, 6, 7, 24, 25, 26, 32

[56] References Cited

U.S. PATENT DOCUMENTS

| | | | |
|---|---|---|---|
| 5,204,951 | 4/1993 | Keener et al. | 710/114 |
| 5,206,943 | 4/1993 | Callison et al. | 395/425 |
| 5,448,702 | 9/1995 | Garcia, Jr. et al. | 710/24 |
| 5,504,868 | 4/1996 | Krakirian | 710/5 |
| 5,619,728 | 4/1997 | Jones et al. | 710/27 |
| 5,634,099 | 5/1997 | Andrews et al. | 710/24 |
| 5,668,971 | 9/1997 | Neufeld | 711/111 |
| 5,696,989 | 12/1997 | Miura et al. | 710/24 |
| 5,713,044 | 1/1998 | Gillespie et al. | 710/22 |
| 5,740,465 | 4/1998 | Matsunami et al. | 395/825 |
| 5,771,397 | 6/1998 | Hospodor et al. | 710/35 |
| 5,860,089 | 1/1999 | Ishii | 711/112 |
| 5,875,299 | 2/1999 | Ooe et al. | 395/200.46 |
| 5,875,349 | 2/1999 | Cornaby et al. | 395/825 |

FOREIGN PATENT DOCUMENTS 6119288  4/1994  Japan .

Primary Examiner—Richard L. Ellis
Attorney, Agent, or Firm—Price Gess & Ubell

[57] ABSTRACT

A data transfer apparatus is provided for transferring data with a DMA method between a plurality of disk apparatuses and a memory using a DMA command table. A processor generates the DMA command table composed of an array of the DMA commands which are each composed of an address (starting address) of the data area and a size of data to be transferred. A disk access unit transfers data between the disk apparatuses and the memory using the DMA command table. When it is judged that the disk apparatus currently transferring data has temporarily released the bus use right, the processor, concurrently in preparation for the resumption of the data transfer, updates the DMA command table by deleting DMA commands having been executed and adding new DMA commands. This eliminates or reduces the generation of the table update interrupt.

21 Claims, 22 Drawing Sheets

| SLOT \ MAGNETIC DISK APPARATUS | 2a | 2b | 2c |
|---|---|---|---|
| 3 | T15-P83 | T10-P78 | |
| 2 | T03-P55 | T21-P18 | T25-P34 |
| 1 | T07-P10 | T04-P05 | T16-P22 |

| SLOT \ MAGNETIC DISK APPARATUS | 2a | 2b | 2c |
|---|---|---|---|
| 3 | T15-P84 | T10-P79 | |
| 2 | T03-P56 | T21 P19 | T25 P35 |
| 1 | T07-P11 | T04-P06 | T16-P23 |

FIG. 8

| | DISK ACCESS UNIT 3 | MAGNETIC DISK APPARATUS 2c | MAGNETIC DISK APPARATUS 2b | MAGNETIC DISK APPARATUS 2a |
|---|---|---|---|---|
| ID NUMBER | 7 | 2 | 1 | 0 |
| PRIORITY IN OBTAINING BUS USE RIGHT | HIGH ←——————————————→ LOW | | | |

DATA TRANSFER APPARATUS WITH IMPROVED THROUGHPUT DUE TO REDUCED PROCESSING OVERHEAD IN INTERRUPT PROCESS

BACKGROUND OF THE INVENTION (1) Field of the Invention

This invention relates to a data transfer apparatus for transferring data between a plurality of disk apparatuses and a main memory.

(2) Description of the Related Art

Recently, the video on demand system and the video server system have been developed for commercial use in which image data is distributed on request to a plurality of users. In these systems, data transfer apparatuses are used for transferring image data from a plurality of disk apparatuses to a buffer memory at high speed.

The data transfer apparatuses sequentially read image data from the plurality of disk apparatuses in sequence in accordance with user requests and transfer the read image data to the buffer memory.

FIG. 1 is a block diagram showing the construction of a conventional data transfer apparatus included in a video server. The data transfer apparatus reads image data from a plurality of disk apparatuses in sequence in accordance with user requests and transfers the read image data to a main memory (a buffer memory for storing image data) so that the image data is distributed to users. The conventional data transfer apparatus is composed of magnetic disk apparatuses 22a, 22b, and 22c, disk access unit 23, processor 24, and main memory 25.

Magnetic disk apparatuses 22a, 22b, and 22c, connected to an SCSI (Small Computer System Interface) bus, store compressed image data of movies and the like. Each magnetic disk apparatus includes an internal buffer (a disk cache) for temporarily storing data to be read/written. Magnetic disk apparatuses read/write data via the SCSI bus after they obtain the right for using the SCSI bus.

The magnetic disk apparatuses have the disconnect function and the reconnect function. The disconnect function is used to temporarily free the bus for use for another disk apparatus when a head seek occurs or when the internal buffer becomes empty of data during reading/writing data. When this happens, the magnetic disk apparatus issue a disconnect interrupt request to processor 24 via disk access unit 23. The reconnect function is used to obtain the bus use right when a certain amount of data is stored in the internal buffer after the disconnection.

Disk access unit 23 controls reading/writing data from/to magnetic disk apparatuses 22a, 22b, and 22c (disk access control) and directly transfers data between main memory 25 and each of the magnetic disk apparatuses 22a, 22b, and 22c (DMA (Direct Memory Access) control).

Concerning the disk access control, disk access unit 23, after receiving a command for reading/writing data from/to a magnetic disk apparatus (hereinafter the command is called the disk command), passes through three phases to use the SCSI bus in data transfer: bus free phase in which the SCSI bus is free; arbitration phase in which obtainment of the bus use right is attempted; and selection phase or transfer phase in which the SCSI bus can be used.

Concerning the DMA control, disk access unit 23 reads DMA commands sequentially from a DMA command table which is created by processor 24 in main memory 25, then in accordance with the read DMA commands, transfers data from the magnetic disk apparatus directly to the data area in main memory 25. This method is called the DMA chain command method.

FIG. 2 shows a DMA command table. As shown in the drawing, the DMA command table is composed of an array of the DMA commands which are each composed of an address (starting address) of the data area and a size of data to be transferred to a location in the data area specified by the address, the address and the data size each having four bytes in length. In case the main memory is used for a virtual storage, the data size in the DMA command is specified not to exceed the size of one page (e.g., 4 KB) of the virtual storage. As a result, the DMA command table is required to include a lot of DMA commands when a large amount of image data (hundreds of kilo bytes to several mega bytes) is read at once by a video server or the like. Furthermore, the size of the DMA command table itself should not exceed the size of one page. That means the data size specified in one DMA command table has a limit, the data size being equal to a size obtained by totaling all the data sizes specified in the DMA commands of the table.

Processor 24 executes a program stored in main memory 25. More specifically, processor 24 generates the DMA command table, issued the disk commands, issues DMA enable instructions, and performs interrupt process requested from disk access unit 23. With these operations, processor 24 instructs disk access unit 23 to read image data requested by a user by reading a certain amount of image data (for example, an amount of image data corresponding to the images reproduced in one second) from each disk apparatus at a time and to store the read image data into main memory 25.

Processor 24 receives interrupt requests mainly for two kinds of interrupt requests, namely, a disconnect interrupt request and a table update interrupt request.

The table update interrupt request is generally issued when, during a data transfer, the DMA command table becomes empty of DMA command to be executed. That is, the table update interrupt request is issued when data is transferred according to the last DMA command of the DMA command table when the data size specified in the disk command is greater than the data size specified in the DMA command table. For example, if the DMA command table specifies 512 KB of main memory area and the disk command specifies 1 MB of data to be read, the table update interrupt request is issued when the 512 KB of data has been transferred. Processor 24, on receiving the table update interrupt request, updates the DMA command table.

The disconnect interrupt request is issued when an HDD disconnects from the bus. The processor 24, on receiving the disconnect interrupt request, preserves the current state and calculates the rest of the amount of data to be transferred, then, in accordance with this calculation result, changes the addresses and the data sizes specified in the DMA commands. This process performed by processor 4 in preparation for the reconnection is called "repair process" in the present document.

FIG. 3 shows SCSI bus occupation timing and interrupt processing timing of processor 4.

As shown in the drawing, the bus connection timing axis includes solid lines and dashed lines. The solid lines indicate the periods during which the magnetic disk apparatus holds the bus use right; the dashed lines indicates the periods during which the bus is freed. The symbol "R" indicates the reconnection timing or the connection timing (in case of the first obtainment of the bus use right); symbol "D" indicates the disconnection timing.

With regard to the interrupt process axis, the symbol "d" indicates a period during which a disconnect interrupt is processed; and the symbol "c" indicates a period during which a table update interrupt is processed. As in apparent from the drawing, disk access unit 23 keeps the bus use right while processor 24 updates the DMA command table and resumes the data transfer after the table update. Processor 24 performs the repair process when it processes the disconnect interrupt. The bus is freed after the disconnect interrupt is processed and is used by a magnetic disk apparatus by a reconnection or a disk command issued by the processor.

FIG. 4 shows the change of state in one magnetic disk apparatus when the magnetic disk apparatus receives the disk command and transfers the data with the size specified in the disk command.

As shown in FIG. 4, on receiving the disk command from processor 24 (S41: COMMAND ISSUANCE) when the bus is free, disk access unit 23 refers to the DMA command table and starts transferring data between the magnetic disk apparatus and the memory (S42). During the data transfer, the DMA command table is update by an interrupted (I41: DMA COMMAND TABLE UPDATE INTERRUPT) each time the table becomes empty of the DMA command to be executed. The magnetic disk apparatus disconnects from the bus when the internal buffer becomes empty (S43: DISCONNECTION); the magnetic disk apparatus reconnects to the bus when the internal buffer becomes full or when a certain amount of data is stored in the internal buffer (S44: RECONNECTION); and disk access unit 23 resumes the data transfer (S42: DATA TRANSFER). This process is repeated during the data transfer. When the data with the size specified in the disk command has been transferred, execution of the disk command ends (S45), and an interrupt request (I43: COMMAND END INTERRUPT) for notifying the end of the command execution is issued.

In this way, a data transfer is performed in accordance with a disk command issued to a magnetic disk apparatus. As shown in FIG. 1. The disk commands are issued to three magnetic disk apparatuses 22a, 22b, and 22c in sequence. As a result, when on magnetic disk apparatus disconnects from the bus, another one reconnects to the bus.

However, the above conventional data transfer apparatus has a problem that the throughput of data transfer does not improve due to the processing overhead generated in the processor.

The reasons why the overhead is incurred are as follows. Firstly, the table update interrupt requests and the disconnect interrupt requests are frequently issued. While such on interrupt is processed, the data transfer substantially stops. Secondly, when the bus becomes to be free by a disconnection, the processor repeatedly attempts to obtain the bus use right to issue a new disk command. When this happens, the processor cannot proceed to process for the next data transfer, such as generating the DMA command table, generating the disk command, and generating the DMA enable instruction. In the attempt to obtain the bus use right, the processor checks to see if the bus is free via the disk access unit and instructs the disk access unit to obtain the bus use right through the arbitration phase.

SUMMARY OF THE INVENTION

It is therefore an object of the present invention to provide a data transfer apparatus with improved throughput for transferring data between a memory and a plurality of disk apparatuses connected to a bus.

It is another object of the present invention to provide a data transfer apparatus with improved speed of issuing disk commands.

The above objects are achieved by a data transfer apparatus for transferring data with a DMA method between a plurality of disk apparatuses and a memory using a DMA command table, where the plurality of disk apparatuses are connected to a bus, where each of the plurality of disk apparatuses obtains a bus use right for using the bus for a transfer of data, temporarily releases the bus use right depending on an internal state of the disk apparatus, and obtains the bus use right when resuming the transfer of data, the data transfer apparatus comprising: a table generating unit for generating the DMA command table which includes an array of a plurality of DMA commands, where each of the plurality of DMA commands includes an address of a data area of the memory and a size of a piece of data to be transferred; a transferring unit for performing a data transfer between one of the plurality of disk apparatuses and the memory using the DMA command table; a temporary release judging unit for judging whether the disk apparatus in the data transfer has temporarily released the bus use right; and a table updating unit for, when the temporary release judging unit judges that the disk apparatus has temporarily released the bus use right, updating the DMA command table by deleting DMA commands having been executed and adding new DMA commands to that the disk apparatus resumes the data transfer.

With the above construction, it is possible to eliminate or reduce the generation of the table update process since when the temporary release judging unit judges that the disk apparatus in the data transfer has temporarily released the bus use right, the DMA command table is updated in preparation for the resumption of the data transfer.

In the above data transfer apparatus, the table generating unit may generate the DMA command table so that a total of sizes specified in the plurality of DMA commands in the DMA command table is equal to a first data size, where the first data size is greater than or equal to a second at a size which is a maximum amount of data to be transferred in succession by each of the plurality of disk apparatuses without temporary releasing the bus use right.

In the above data transfer apparatus, each of the plurality of disk apparatuses may include an internal buffer and transmit data from the internal buffer to the bus and concurrently, write data from a disk into the internal buffer, where the first data size satisfies a formula:

$$S\_trans \geq \Sigma((B\_inner/B\_bus)^{n-1} * S\_inner\_buffer),$$

where "S_trans" represents the first data size, "B_inner" represents a data transfer speed in each of the plurality of disk apparatuses of transferring data from the disk to the internal buffer, "B_bus" represents a data transfer speed of the bus, "S inner_buff" represents a capacity of the internal buffer, and n represents integers 1 and greater.

With the above construction, it is possible to completely eliminate the generation of the table update interrupt since by the time the disk apparatus temporarily releases the bus use right, the DMA command table does not become empty of DMA commands to be executed.

The above data transfer apparatus may further comprise: a command generating unit for generating a certain number or less of disk commands for each of the plurality of disk apparatuses in a certain cycle, the disk command specify one of data reading and data writing; a queue holding unit for holding disk commands generated by the command generating unit in a queue; and a command issuing unit for, when the temporary release judging unit judges that the disk apparatus has temporarily released the bus use right, fetching a disk command from the queue and issuing the fetched disk command to another disk apparatus, where the transferring unit starts a data transfer between the other disk apparatus and the memory when the other disk apparatus receives the disk command from the command issuing unit and resumes the data transfer when the disk apparatus having temporarily released the bus use right obtains the bus use right.

With the above construction, generated disk commands are temporarily held in the queue holding unit in a queue. Accordingly, disk commands are always generated prior to the actual timing of the issuance of the disk commands, regardless of the bus state (whether the bus use right has been obtained or not). Furthermore, the data transfer apparatus improves throughput of data transfer by reducing the overhead.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows ID numbers (SCSI ID) assigned to the HDDs and disk access unit;

DESCRIPTION OF THE PREFERRED EMBODIMENTS

Embodiment 1

Construction of the Video Server

Figure 5:
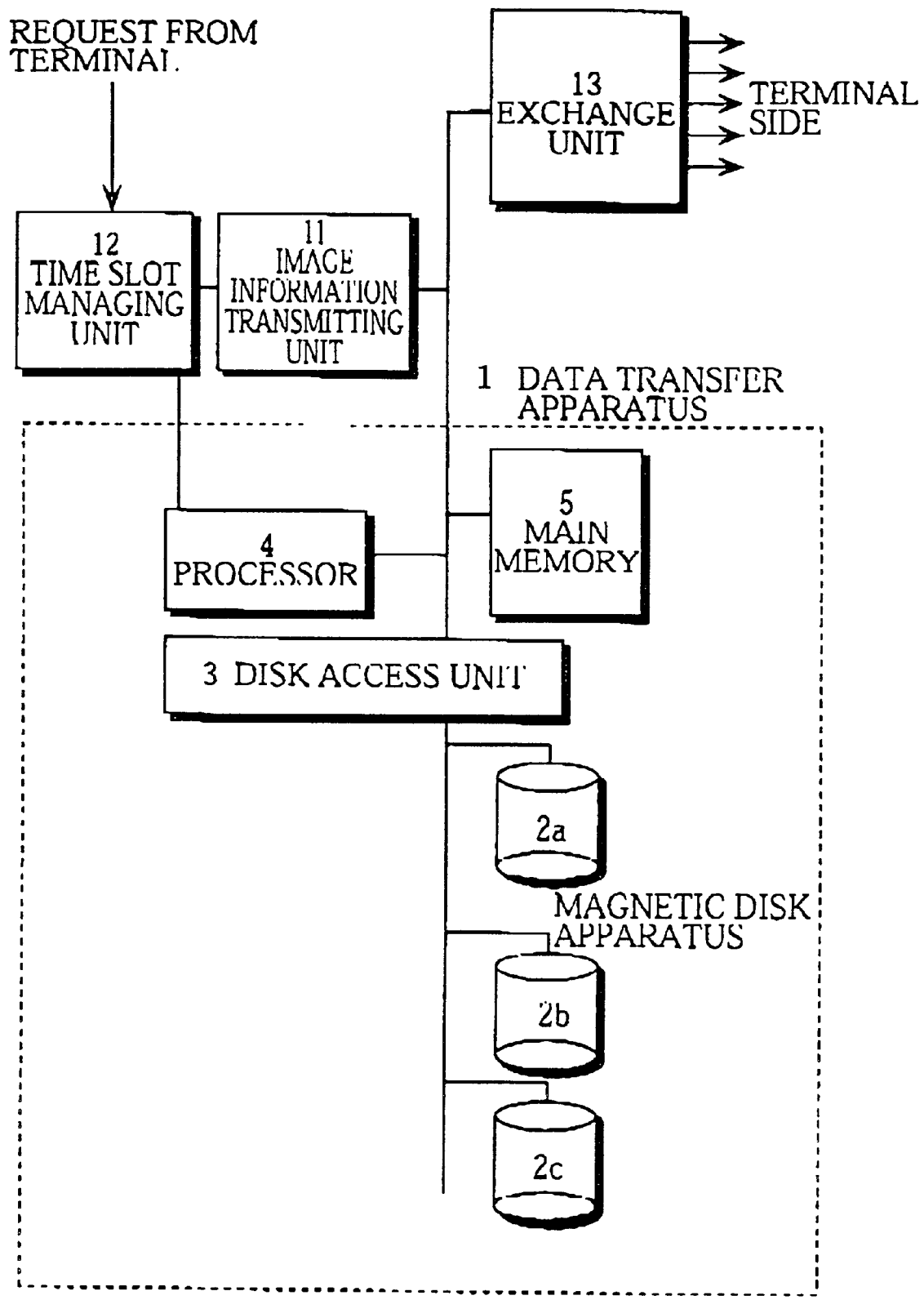
FIG. 5 is a block diagram showing the construction of a video server which includes the data transfer apparatus of the present invention in Embodiment 1.

FIG. 5 is a block diagram showing the construction of a video server which includes the data transfer apparatus of the present invention in Embodiment 1. The video server is composed of data transfer apparatus 1, image information transmitting unit 11, time slot managing unit 12, and exchange unit 13. The video server distributes image data to a plurality of user terminals (hereinafter called terminals) in real time.

The data transfer apparatus 1 is composed of magnetic disk apparatuses (hereinafter called HDDs) 2a, 2b, and 2c, disk access unit 3, processor 4, and main memory 5. The data transfer apparatus 1 transfers the image data from each HDD to main memory 5.

The image information transmitting unit 11 transmits the image data in main memory 5, which has been transferred from each HDD by data transfer apparatus 1, to each terminal via exchange unit 13.

The time slot managing unit 12 manages a time slot table which shows image data to be read on request from the terminals, for each period in a certain cycle (a cycle of one second in case of the present Embodiment) and also shows the HDDs storing the image data. It is supposed in the present Embodiment that each HDD supports three time slots at the maximum, that is, it is possible for each HDD to supply the image data to three terminals simultaneously in each period of the cycle, at the maximum. The time slot table shows each time slot corresponding to an HDD to which read information, namely a terminal number and a read position, is assigned, the read information having an instruction to read image data with a certain size, where the certain size corresponds to a one-second reproduction and it is supposed in the present Embodiment that the certain size is 1,024 KB.

Figures 6A, 6B, 7:
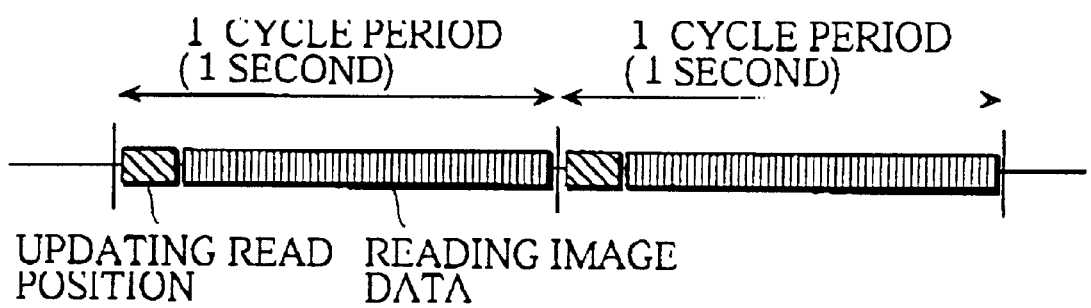
FIGS. 6A and 6B show time slot tables.
FIG. 7 shows updating of the time slot table in each period of cycle.

FIGS. 6A and 6B show time slot tables. For example, in FIG. 6A, time slot 1 for HDD 2a is assigned read information "T07–P10." Here, "T07" represents a terminal number, and "P10" a read position. FIG. 6A indicates that eight terminals currently use the video server. FIG. 6A shows the time slot table in the next period of cycle to FIG. 6A, namely, one second later. As shown in FIG. 6B, the read position for each time slot has been updated from that of FIG. 6A.

FIG. 7 shows updating of the time slot table in each period of cycle. As shown in the drawing, time slot managing unit 12 updates the read position at the start of each cycle. The data transfer apparatus 1 reads the image data in accordance with the updated read position during the rest of the period of cycle.

The exchange unit 13 distributes the image data, which is read from main memory 5 by image information transmitting unit 11, to the terminals specified in the time slot table.

Construction of the Data Transfer Apparatus

The construction of the data transfer apparatus 1 is described below.

The HDDs 2a to 2c, which are connected to an SCSI (Small Computer System Interface) bus, store compressed image data, such as the compressed image data of different movies. The HDDs 2a to 2c are not described in detail since they are equal to the magnetic disk apparatuses used in the conventional technique. The HDDs of the present Embodiment are assigned respective iD numbers as shown in FIG. 8 and that in the arbitration phase in the SCSI bus, a HDD with a larger ID number is given a higher priority. It is supposed that a buffer in each HDD has a capacity of 256 KB. It is also supposed that each HDD reads data from the disk into the internal buffer at the speed of 5 MB/sec and that the data transfer speed of the SCSI bus is 10 MB/sec.

The disk access unit 3 controls reading/writing data from/into each HDD (disk access control) and controls direct data transfers between each HDD and main memory 5 (DMA (Direct Memory Access) control).

When disk access unit 3 performs the disk access control, disk access unit 3 can use the SCSI bus in a dedicated state (selection phase or transfer phase) if disk access unit 3 obtains the right to use the SCSI bus through first the bus free phase and then the arbitration phase.

When performing the DMA control, disk access unit 3 reads the DMA commands, which are included in the DMA command table generated in main memory 5 by processor 4, in sequence and the directly writes data read from an HDD into the data area in main memory b. The DMA command table is the same as the one shown in FIG. 2. In the present Embodiment, however, the data transfer size for a whole DMA command table is set so as not to generate a table update interrupt request by the HDDs.

The processor 4 executes the program stored in main memory 5 and performs the DMA control, that is, processor 4, in accordance with the read information specified in the time slot table, instructs disk access unit 3 to read image data from the HDDs and to transfer the read image data to the main memory with the DMA-transfer for each period of cycle.

More specifically, processor 4, for each read information specified in the time slot table, (1) generates the DMA command table, (2) instructs disk access unit 3 to enable the DMA transfer, (3) generates and issues a disk command instructing disk access unit 3 to read the image data according to the read information, and (4) processes an interrupt on receiving an interrupt request from disk access unit 3. These processes are described below.

Figure 1:
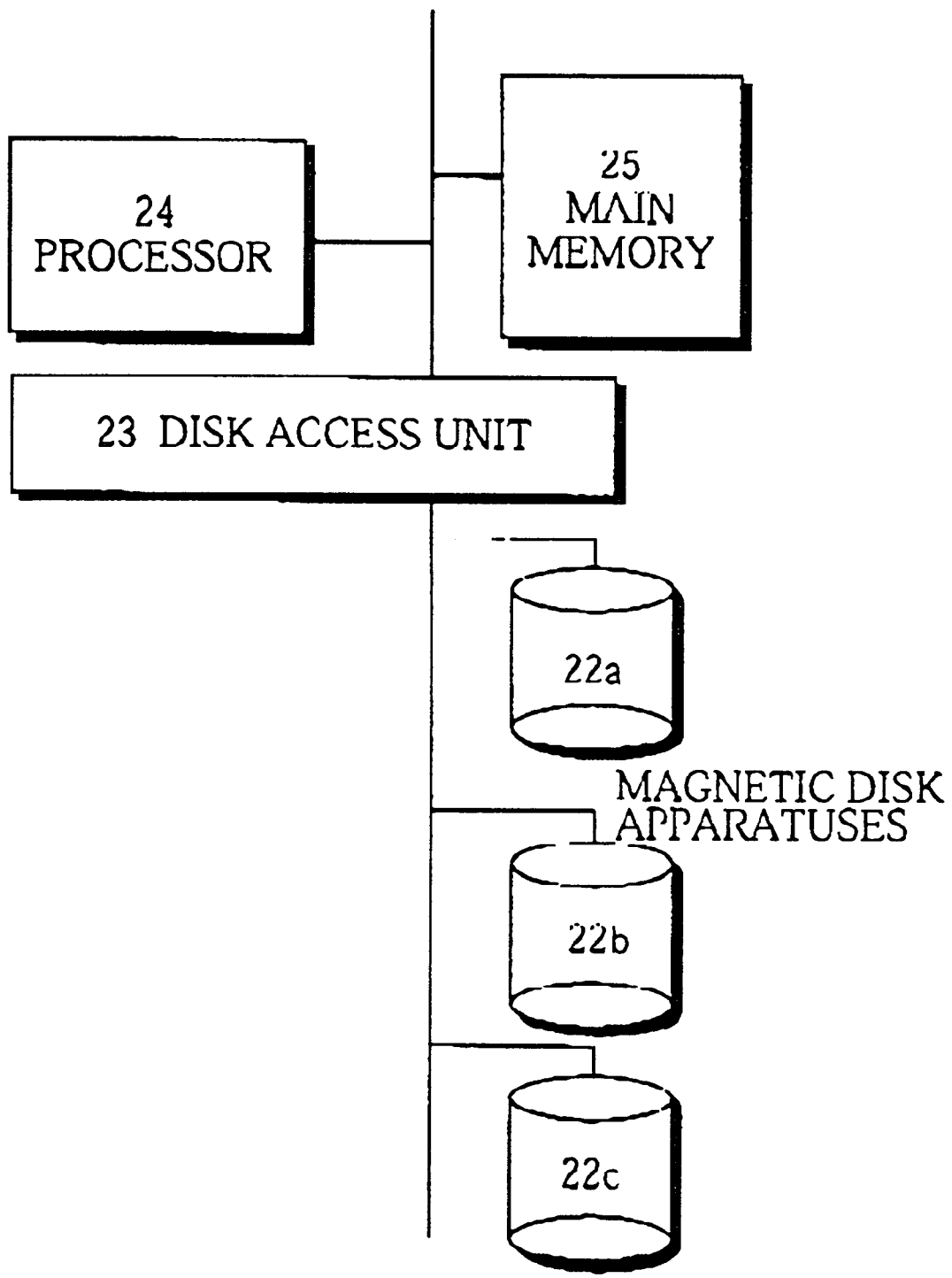
FIG. 1 is a block diagram showing the construction of a conventional data transfer apparatus included in a video server.
Figure 2:
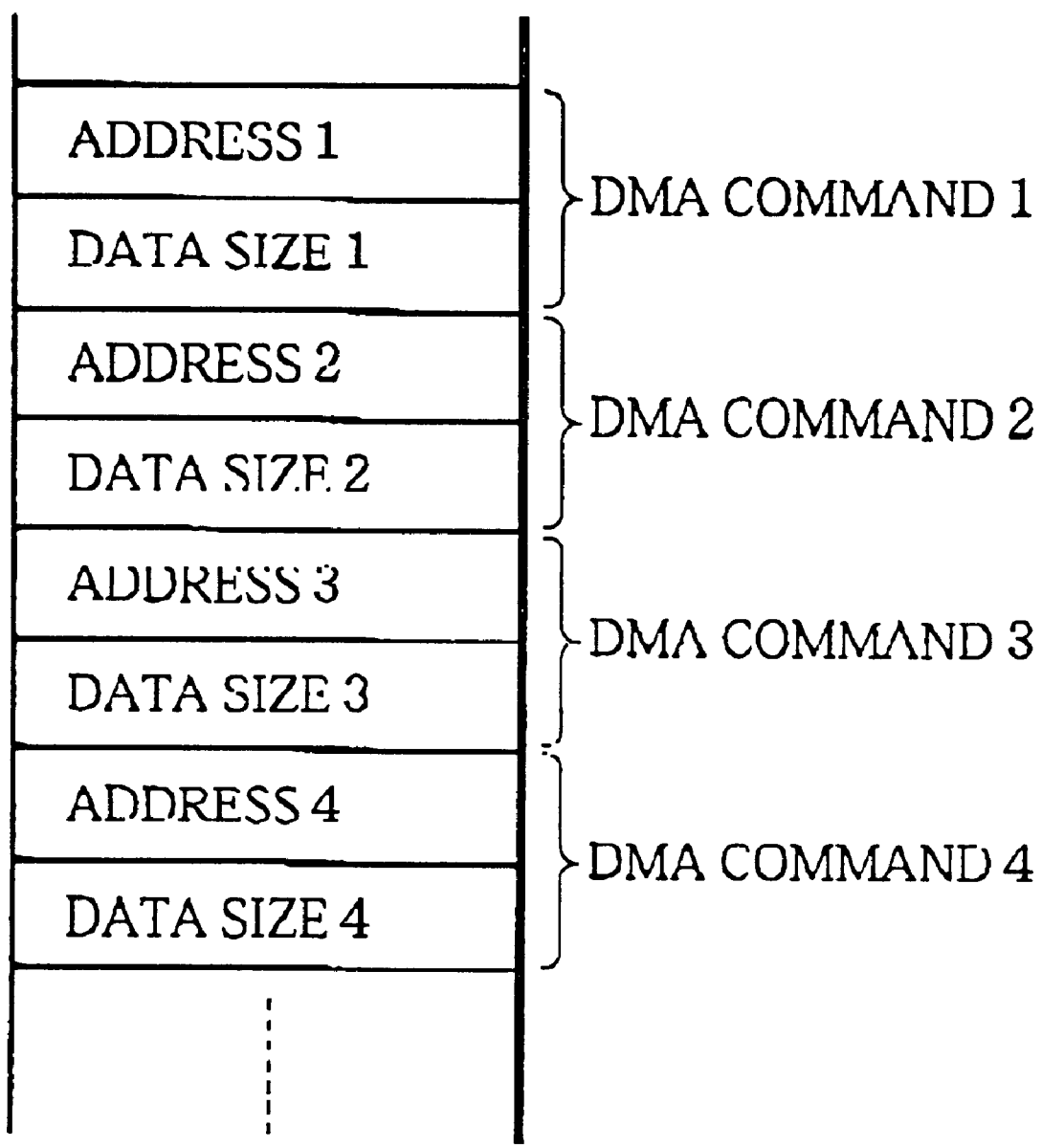
FIG. 2 shows a DMA command table.
Figure 3:
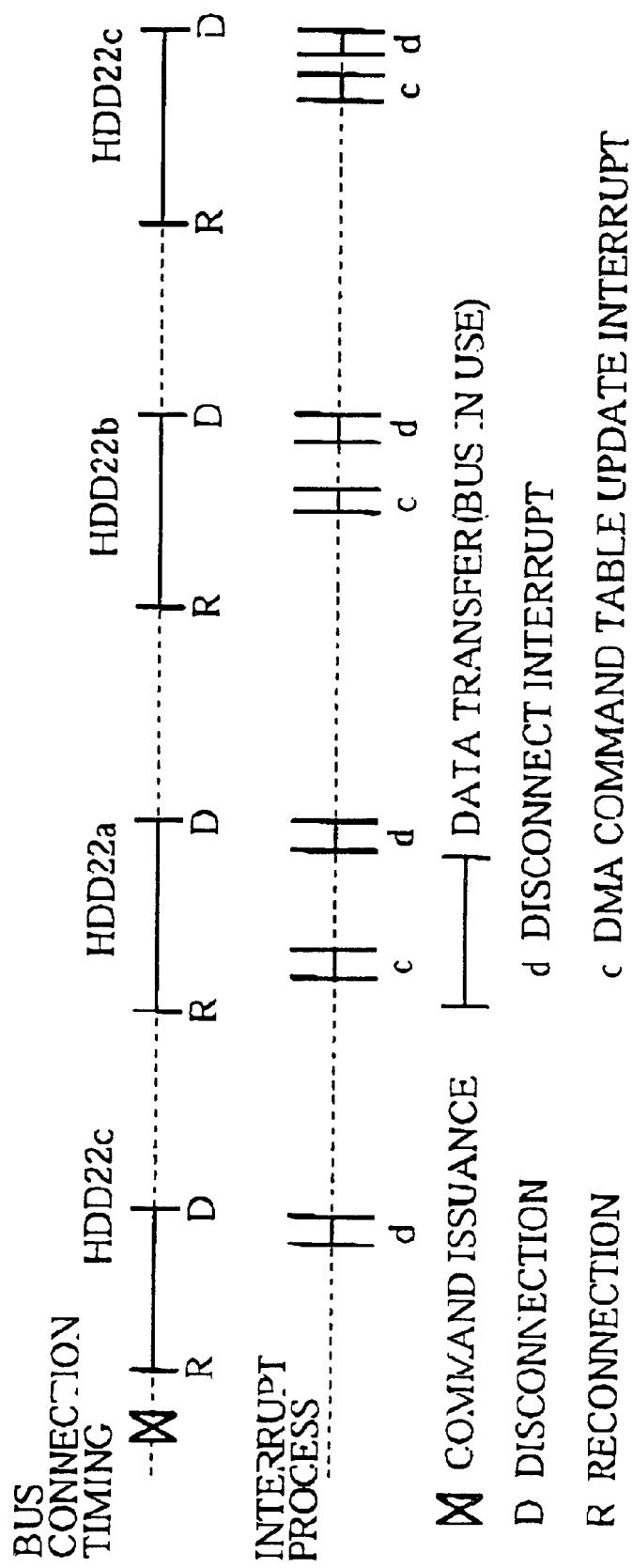
FIG. 3 shows SCSI bus occupation timing and interrupt processing timing of the conventional data transfer apparatus.
Figure 4:
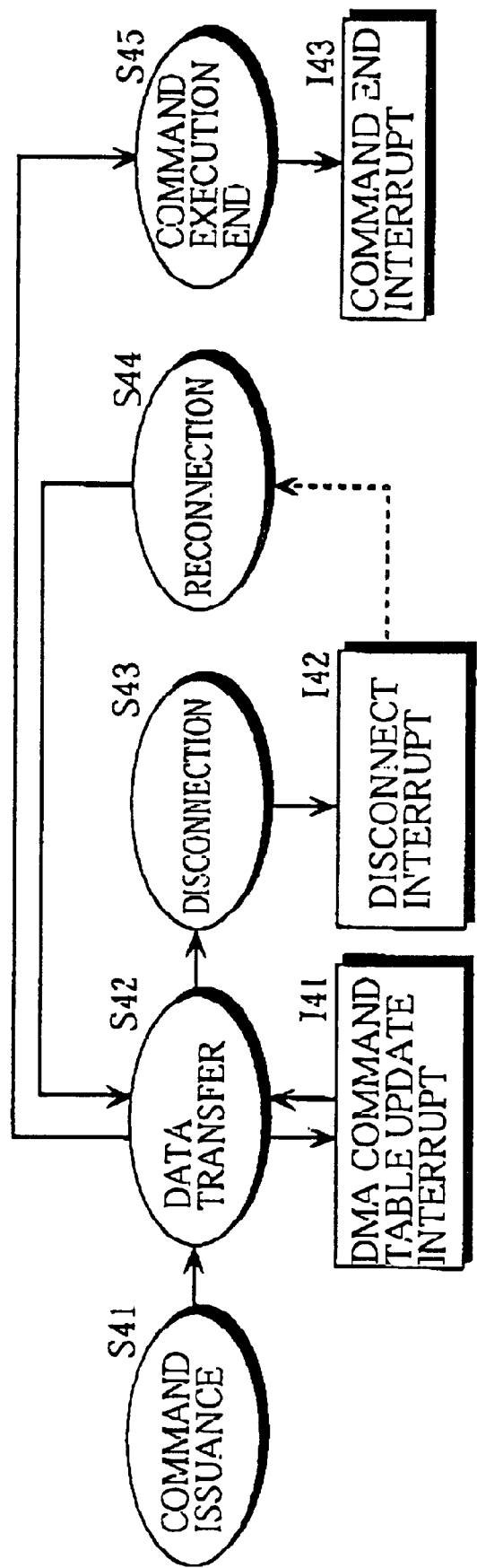
FIG. 4 shows the change of state in one magnetic disk apparatus when the magnetic disk apparatus receives the disk command and transfers the data with the size specified in the disk command.

(1) the DMA command table is, as shown in FIG. 2, composed of an array of the DMA commands which are each composed of an address (starting address) of the data area and a size of data to be transferred to a location in the data area specified by the address, the address and the data size each having four bytes in length.

It is supported in the present Embodiment that processor 4 sets the data transfer size for a whole DMA command table to 512 KB or greater.

Figure 9:
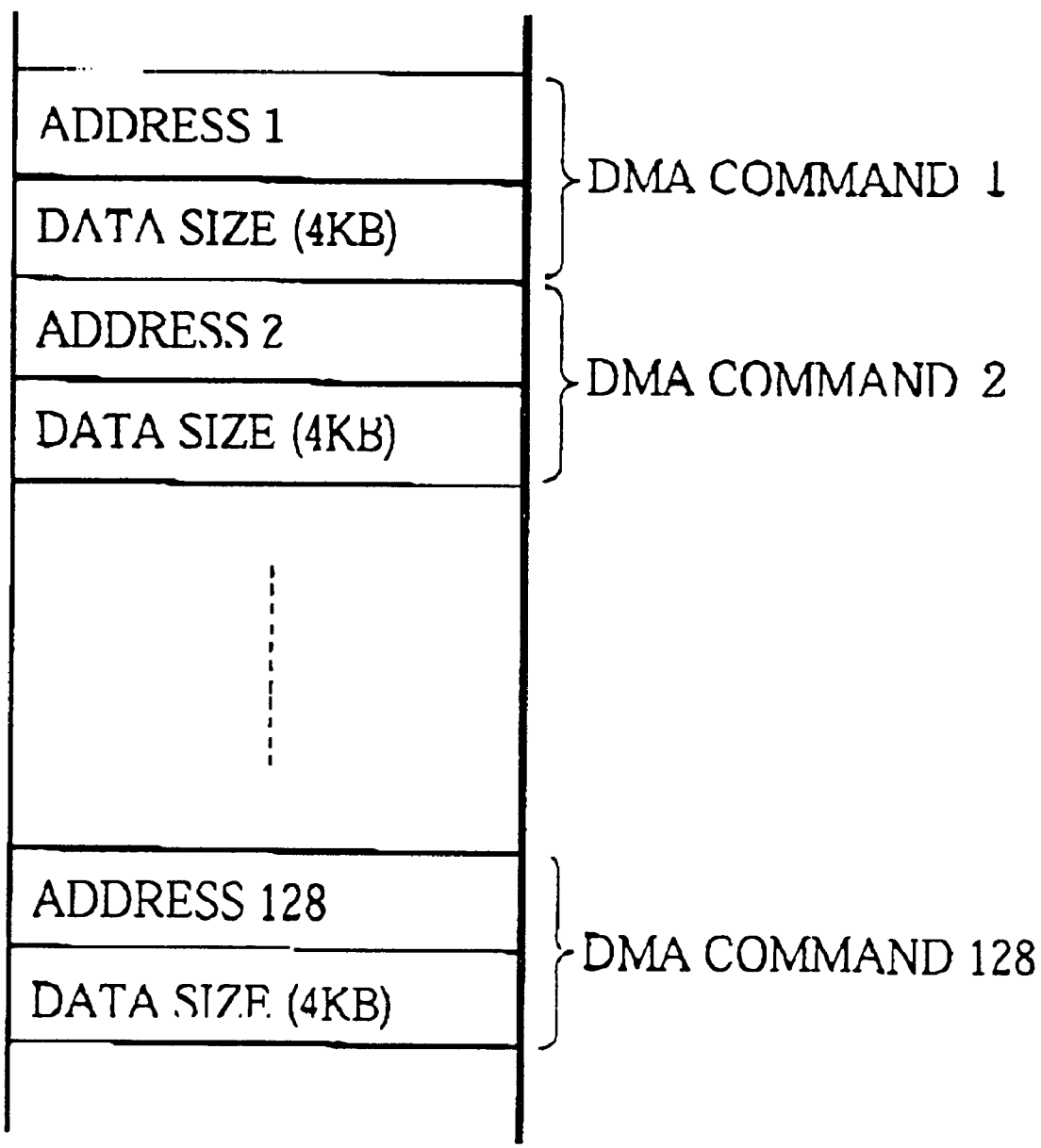
FIG. 9 shows a DMA command table used in Embodiment 1.

FIG. 9 shows a DMA command table. As shown in the drawing, the DMA command table is composed of DMA command 1–128. Each DMA command specifies 4 KB as the data size. This is because the virtual storage corresponding to main memory 5 deals with 4 KB-pages. The total data transfer size of the 128 DMA commands shown in FIG. 9 is set to 512 KB.

The data transfer size is determined using Formula 1 shown below so as not to generate the table update interrupt request.

Formula 1

$$S\_trans \geq \Sigma((B\_inner/B\_scsi)^{n-1} \cdot S\_inner\_buff),$$

where "S_trans" represents the data transfer size for a whole DMA command table, "B_inner" represents the data transfer speed in the HDDs for transferring data from the internal disk to the internal buffer, "B_scsi" represents a data transfer speed of the SCSI bus, "S_inner _buff" represents the capacity of the internal buffer in the HDDs, and n represents integers 1 and greater (n=1, 2, 3, . . . ).

In the present Embodiment, "B_inner" is set to 5 MB/sec. "B_scsi" is set to 10 MB/sec, and "S_inner_buff" is set to 256 B. In this case, it is possible for each HDD to read 128 KB of data from the disk into the internal buffer while transmitting 256 KB of data from the internal buffer to the SCSI bus. As this process is repeated, the right-hand side of Formula 1 is represented as: 256+128+64+32+. . . =512 KB. The obtained value for the right-hand side of Formula 1 theoretically indicates a maximum amount of data to be sent to the SCSI bus from an HDD in one sequence.

Accordingly, when the data transfer size "S_trans" for the DMA command table is equal to or greater than 512 KB, and when the data transfer starts with the internal buffer full, no table update interrupt request occurs.

(2) The DMA enable instruction issued to disk access unit 3 is composed of: an address of main memory 5 indicating a location where the DMA command table is stored; and an ENABLE instruction for the DMA transfer.

(3) The disk command is composed of: an ID of an HDD; a command type; a sector number of the disk; and a reading data size. In the present Embodiment, it is supposed that the command type is "read" and the reading data size is 1,024 KB.

(4) The disk access unit 3 issues interrupt requests mainly for two kinds of interrupt requests, namely, a disconnect interrupt request and at able update interrupt request.

The table update interrupt request is generally issued when, during a data transfer, the DMA command table becomes empty of DMA command to be executed. That is, the table update interrupt request is issued when data is transferred according to the last DMA command of the DMA command table when the data size specified in the disk command is greater than the data size specified in the DMA command table. For example, if the DMA command table specifies 512 KB of main memory area and the disk command specifies 1 MB of data to be read, the table update interrupt request is issued when the 512 KB of data has been transferred.

Processor 4, on receiving the table update interrupt request, update the DMA command table. More specifically, processor 4 generates a new DMA command table for transferring the data with an amount equal to the rest of the data size specified in the disk command. The processor 4 then instructs disk access unit 3 to resume the DMA transfer. The data transfer apparatus of the present invention, as a general rule, does not issue the table update interrupt request.

The disk access unit 3 issue the disconnect interrupt request when an HDD disconnects from the bus. In the present Embodiment, disk access unit 3 issues the disconnect interrupt request when an HDD transfers 512 KB of data or less and disconnects from the bus.

The processor 4, on receiving the disconnect interrupt request, preserves the current state and calculates the rest of the amount of data to be transferred, then, in accordance with this calculation result, changes the addresses and the data sizes specified in the DMA commands. This process performed by processor 4 in preparation for the reconnection is called "repair process" in the present document. The processor 4 updates the DMA command table as well as performing the repair process. In this table update process, processor 4 deletes the executed DMA commands and adds new DMA commands until the data transfer size of the DMA command table reaches the "S_trans" or until the data transfer size of the DMA command table including the size of the data transferred by the executed DMA commands reaches the data size specified in the disk command.

As understood from the above description, data transfer apparatus 1 of the present Embodiment does not issue the table update interrupt request since processor 4 updates the DMA command table when performing the disconnect interrupt process and since the data transfer size is determined using the Formula 1 so as not to generate the table update interrupt request.

Operation of Processor 4

Figure 10A:
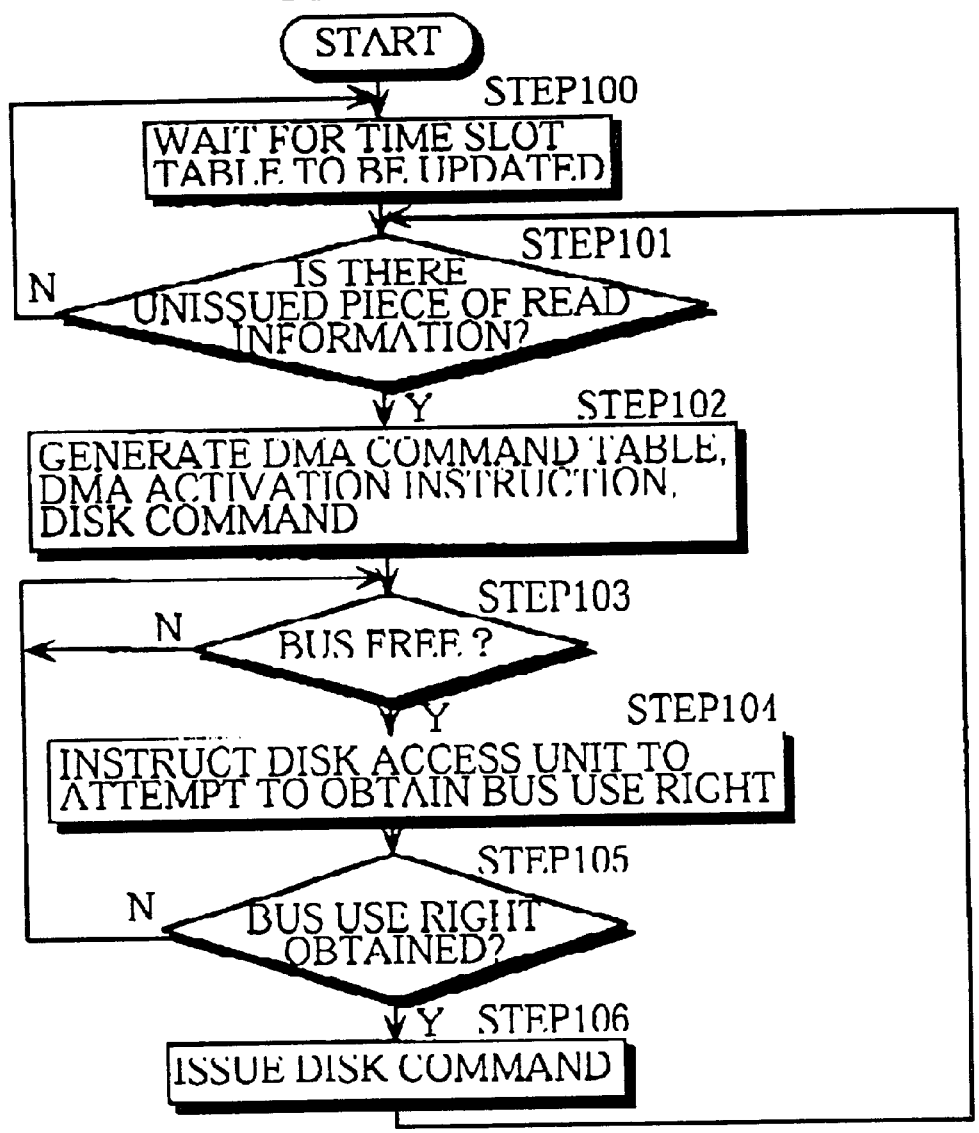
FIGS. 10A and 10B are flowcharts showing the processes performed by the processor during one period of cycle (one second)
Figure 10B:
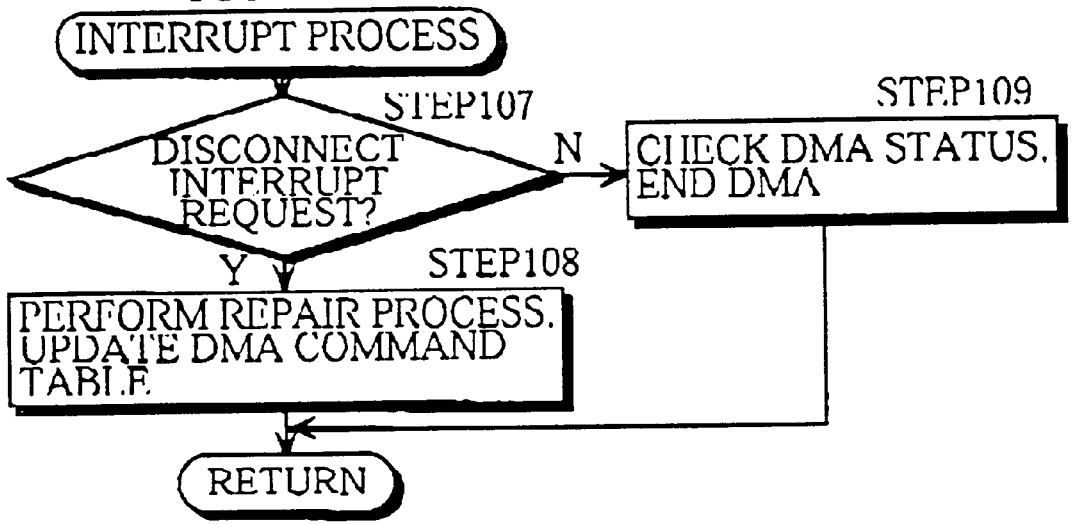

FIGS. 10A and 10B are flowcharts showing the processes performed by processor 4 during one period of cycle (one second).

As shown in FIG. 10A, processor 4 waits for time slot managing unit 12 to complete updating the time slot table (step 100). The processor 4 refers to the updated time slot table to judge whether the table includes a piece of read information having not been issued (step 101). If it includes, processor 4 generates a DMA command table, a DMA enable instruction, and a disk command, corresponding to the piece of read information (step 102). As described earlier, the DMA command table, which corresponds to one page in the virtual storage, specifies 512 KB as the transfer data size. Also, the disk command specifies 1,024 KB as the size of the image data to be read, in the present Embodiment.

The processor 4 waits until the bus is disconnected (until the bus is in the bus free state) (step 103). After the bus is disconnected, processor 4 instructs disk access unit 3 to participate in the arbitration to attempt to obtain the right for using the bus (step 104). The processor 4 may not succeed in obtaining the right it, for example, another HDD reconnects to the bus during the period between the disconnection and the participation of disk access unit 3 in the arbitration. The processor 4 repeats the attempt until is obtains the right for using the bus (steps 103–105). On obtainment of the right for using the bus, processor 4 issues the DMA enable instruction and the disk command (step 106).

The processor 4 then repeats the above processes as far as the time slot table includes an unissued piece of read information.

As described above, processor 4 issues a disk command for each piece of read information in the time slot table, during one period of cycle.

FIG. 10B is a flowchart showing the interrupt process performed by processor 4.

The processor 4, on receiving an interrupt request, judges whether the request is the disconnect interrupt request (step 107). If it is, processor 4 performs the repair process and updates the DMA command table (step 108). If judged as negative in step 107, that is, if the interrupt request is one for notifying the end of the disk command execution, processor 4 checks the DMA status in disk access unit 3 and end the current DMA process (step 109).

Operation of Disk Access Unit 3

Figure 11:
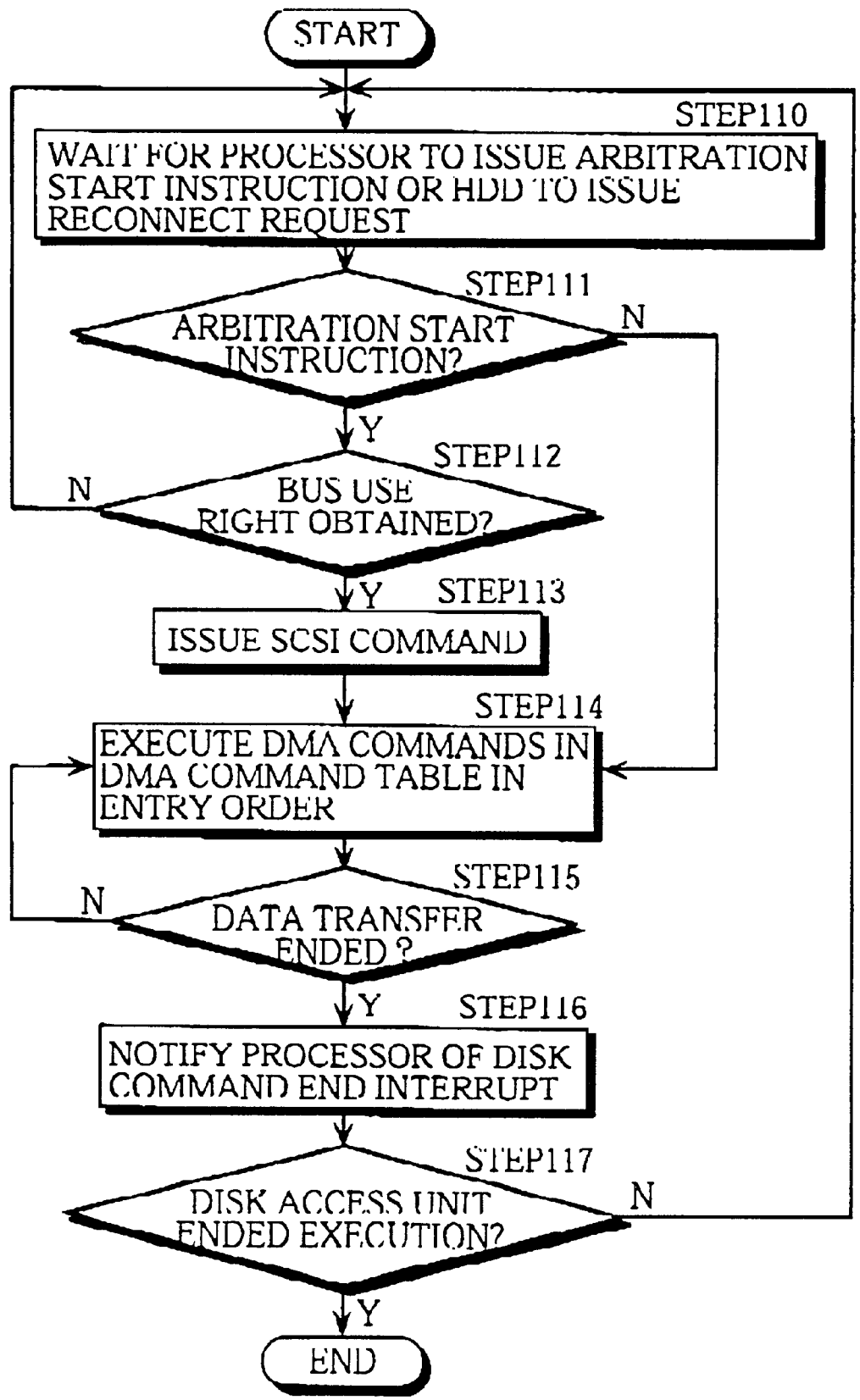
FIG. 11 is flowchart showing the processes performed by the disk access unit.

FIG. 11 is flowchart showing the process performed by disk access unit 3.

As shown in the drawing, disk access unit 3 waits for processor 4 to issue the arbitration start instruction or an HDD to issue a reconnect request (step 110). The disk access unit 3, on receiving an instruction, judges whether the instruction is the arbitration start instruction (step 111). If it is, disk access unit 3 starts the arbitration and judges whether the right for using the bus is obtained (step 112). If judged as positive, disk access unit 3 issues the SCSI command to the HDD in accordance with the disk command issued from processor 4 (step 113). The disk access unit 3 repeats reading the DMA commands in the DMA command table in main memory 5 in the entry order and transferring data according to the read DMA commands (steps 114–115).

The disk access unit 3, on receiving a reconnect request from an HDD, that is, when it is judges as negative in step 111, resumes the data transfer of the HDD (steps 114–115).

When the HDD disconnects from the bus in the middle of a data transfer, the data transfer from the HDD stops. However, in the HDD, data is kept to be written into the internal buffer while the data transfer stops. In this period of time, the DMA command table is updated by the disconnect interrupt process. When the internal buffer becomes full or when a certain amount of data is stored in the internal buffer, the HDD reconnects to the bus and the data transfer resumes in accordance with the updated DMA command table.

The following is a description of the operation of the data transfer apparatus of the present invention in the present Embodiment.

Figure 12:
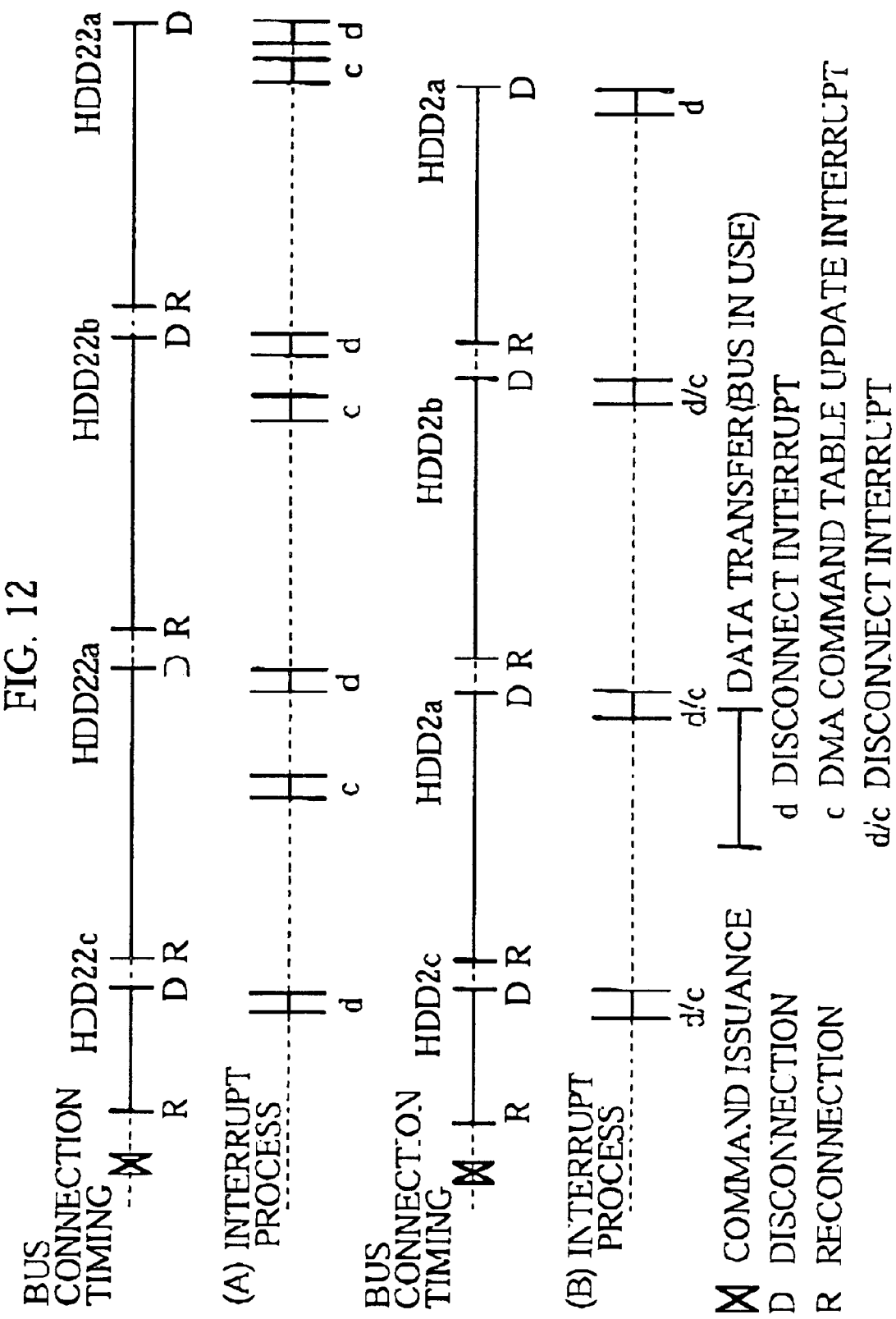
FIG. 12 shows a comparison between the apparatuses of the conventional technique and Embodiment 1 in terms of the occupation of the SCSI bus and the interrupt process.

FIG. 12 shows a comparison between the apparatuses of the conventional technique and the present Embodiment in terms of the occupation of the SCSI bus and the interrupt process by processor 4.

As shown in the drawing, the bus connection timing axis includes solid lines and dashed lines. The solid lines indicate the periods during which the HDD holds the bus use right, the dashed lines indicates the periods during which the bus is freed. The symbol "R" indicates the reconnection timing or the connection timing (in case of the first obtainment of the bus use right); symbol "D" indicates the disconnection timing.

With regard to the interrupt process axis, the symbol "d" indicates a period during which a disconnect interrupt is processed; the symbol "c" indicates a period during which a table update interrupt is processed; and the symbol "d/c" indicates a period during which a disconnect interrupt of the present Embodiment is processed.

The symbol |X| on the bus connection timing axis of the part (B) in the drawing indicates the timing of issuing the disk command to HDD 2c, while the disk command has already been issued to HDDs 2a and 2b. this is the same for the part (A) of the drawing.

As is apparent from the part (B) of FIG. 12, the table update interrupt request is not generated since processor 4 updates the DMA command table, as well as performing the repair process, when it processes the disconnect interrupt.

Figure 13:
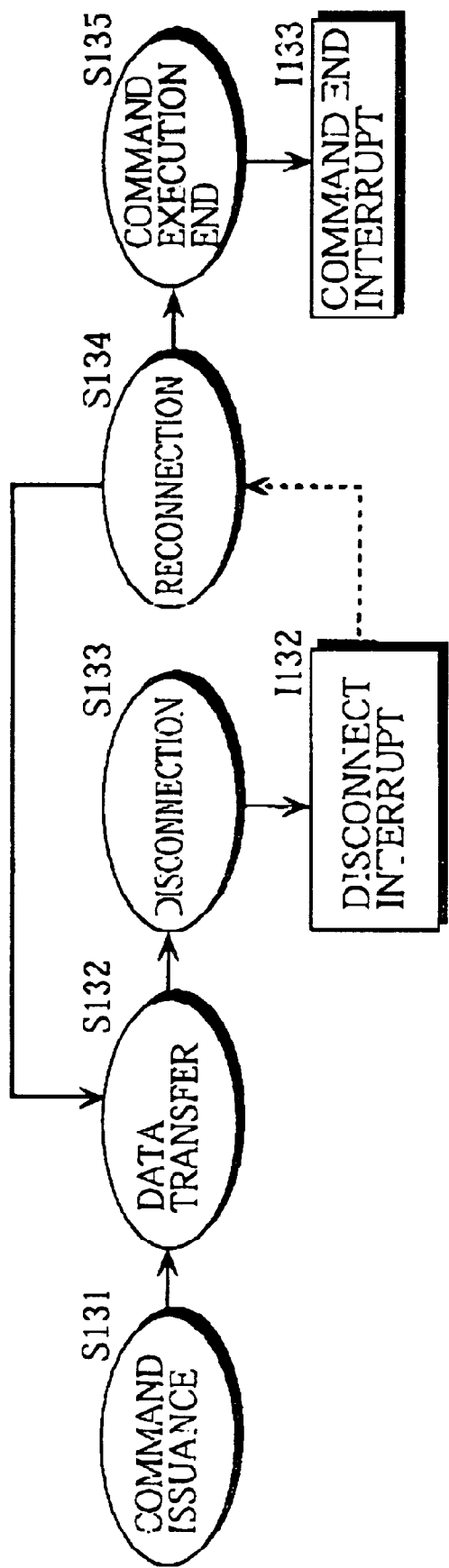
FIG. 13 shows the change of state in one HDD when the HDD receives the disk command and transfers the data with the size specified in the disk command.

FIG. 13 shows the change of state in on HDD when the HDD receives the disk command and transfers the data with the size specified in the disk command.

As shown in the drawing, on receiving the disk command from processor 4 when the bus is free (S131), disk access unit 3 refers to the DMA command table and starts transferring data between the HDD and the memory (S132).

During the data transfer, the HDD disconnects from the bus when the internal buffer becomes empty (S133); the HDD reconnects to the bus when the internal buffer becomes full or when a certain amount of data is stored in the internal buffer (S134); and disk access unit 3 resumes the data transfer (S132). This process is repeated during the data transfer. When the data with the specified in the disk command has been transferred, execution of the disk command ends (S135), and an interrupt request for notifying the end of the command execution is issued (I132).

As described above, disk access unit 3 does not issue the table update interrupt request since the HDD always has the DMA command to execute in the DMA command table.

As apparent from the above description, the data transfer apparatus of the present Embodiment prevents generation of table update interrupt requests. This is achieved by the following arrangements:

(1) The processor 4 updates the DMA command table, as well as performing the repair process, when it processes the disconnect interrupt; and (2) The DMA command table specifies such a data transfer size as is equal to or greater than the maximum data size which can be sent from the HDD to the bus in one sequence without a disconnection between the HDD and the bus.

It is possible with only one of the above arrangements to reduce the rate of generating the table update interrupt request. The above arrangements, in combination, completely eliminates the generation of the table update interrupt request. With such arrangements, it is possible for data transfer apparatus 1 to reduce the overhead of the processor and improve the throughput of the data transfer.

Embodiment 2

Construction of the Video Server

The construction of a video server which includes the data transfer apparatus of the present invention in Embodiment 2 is the same as that of Embodiment 1 except for processor 4 and main memory 5. Accordingly, only processor 4 and main memory 5 are described below.

The main memory 5 includes a queue buffer (also called merely a queue) which holds the DMA commands and the disk commands, as well as having the function described in Embodiment 1.

Figure 14:
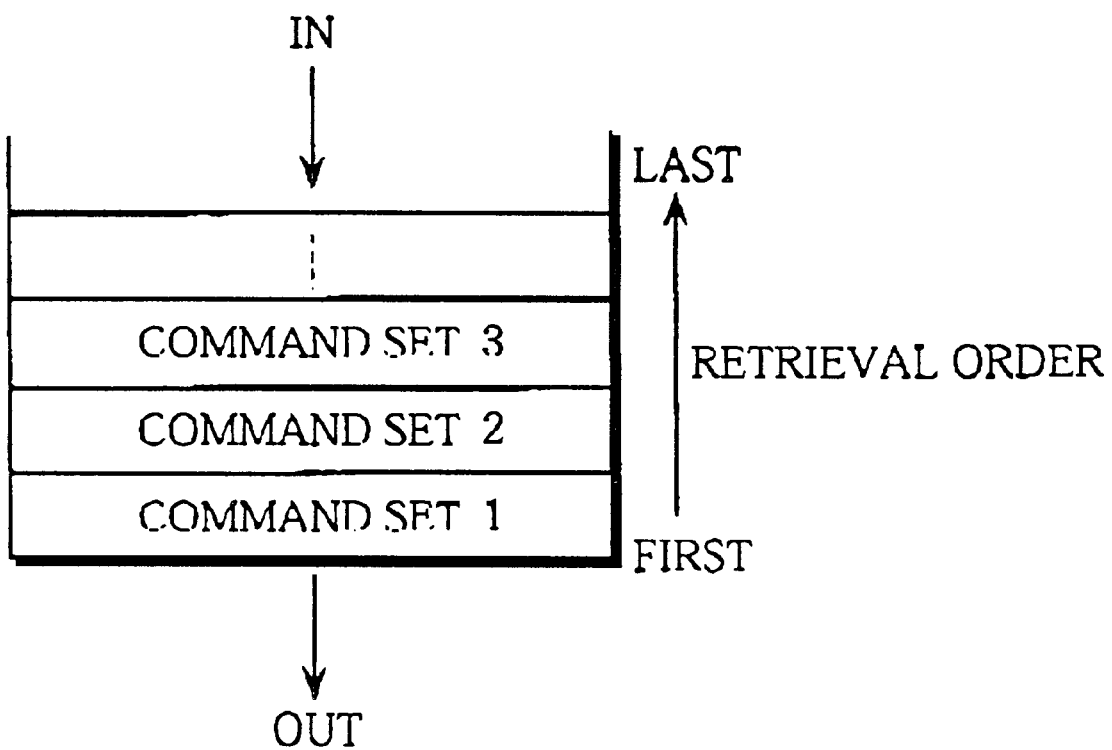
FIG. 14 shows the construction of the queue buffer used in Embodiment 2.

FIG. 14 shows the construction of the queue buffer. As shown in the drawing, the queue buffer stores a plurality of command sets which are each a pair of a DMA enable instruction and a disk command relating to the same image data. The processor 4 stores the command sets into the queue buffer with FIFO (First In First Out) method. Each command set is also called merely a command.

The processor 4 registers the command sets with the queue buffer and issues the command sets from the queue buffer to disk access unit 3 instead of issuing the disk commands as shown in FIG. 10A. The command registration and issuance are performed both in the interrupt process and in other processes.

Command Registration/Issuance by Processor 4

Figure 15:
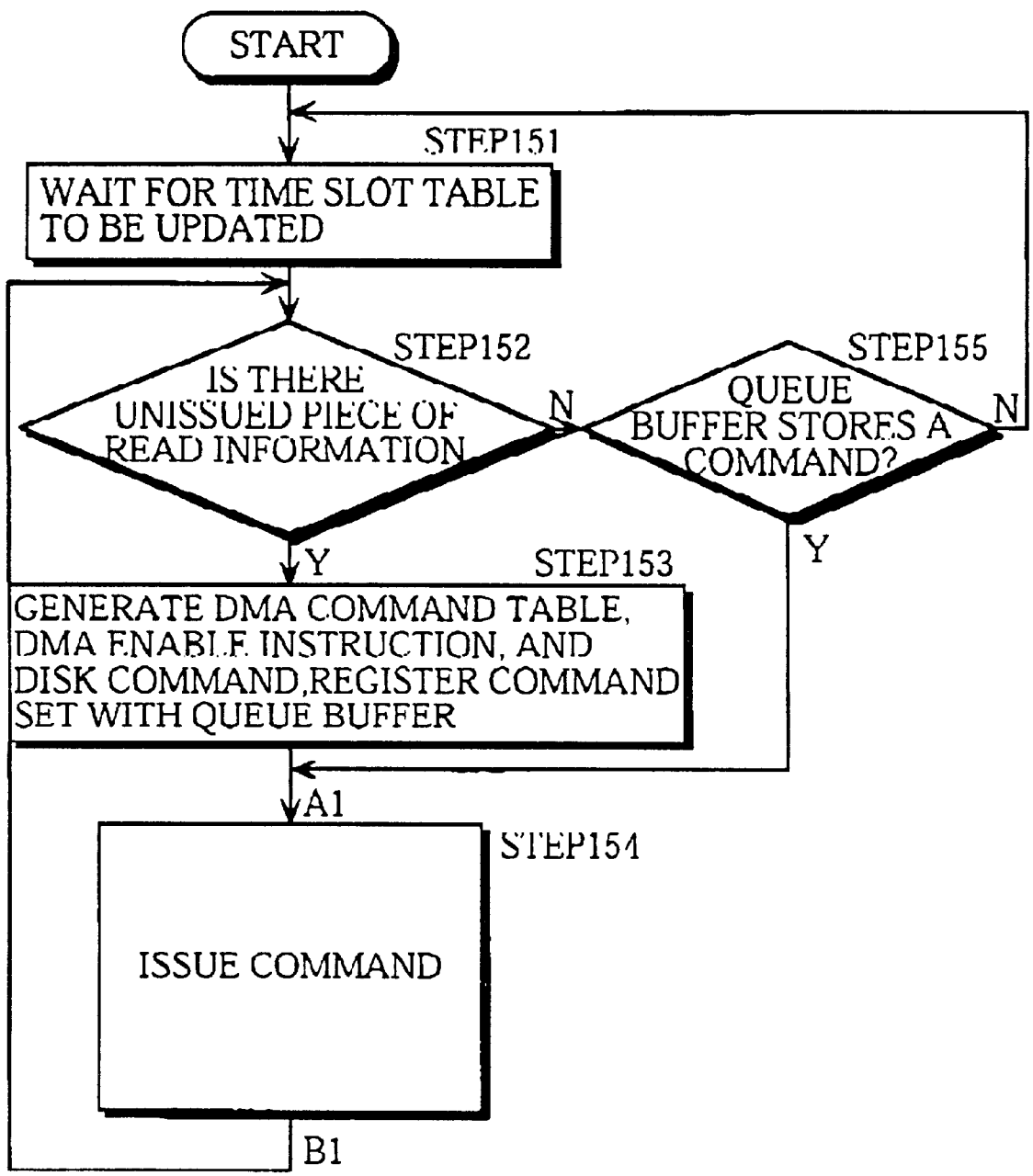
FIG. 15 is a flowchart showing the command registration/issuance process performed by the processor in ordinary process (other than the interrupt process)

FIG. 15 is a flowchart showing the command registration/issuance process performed by processor 4 in ordinary processes (other than the interrupt process).

As shown in FIG. 15, processor 4 waits for time slot managing unit 12 to complete updating the time slot table (step 151). The processor 4 refers to the updated time slot table to judge whether the table includes a piece of read information having not been issued (step 152). If it includes, processor 4 generates a DMA command table, a DMA enable instruction, and a disk command, corresponding to the piece of read information and registers a pair of the DMA enable instruction and the disk command as a command set with the queue buffer stored in main memory 5 (step 153). If judged as negative in step 152, processor 4 judges whether the queue buffer stores a command (step 155). If not, processor 4 waits for time slot managing unit 12 to complete updating the time slot table (step 151).

The processor 4 issues a command set from the queue buffer after, in step 153, the command set is registered with the queue buffer (step 154).

Figure 16:
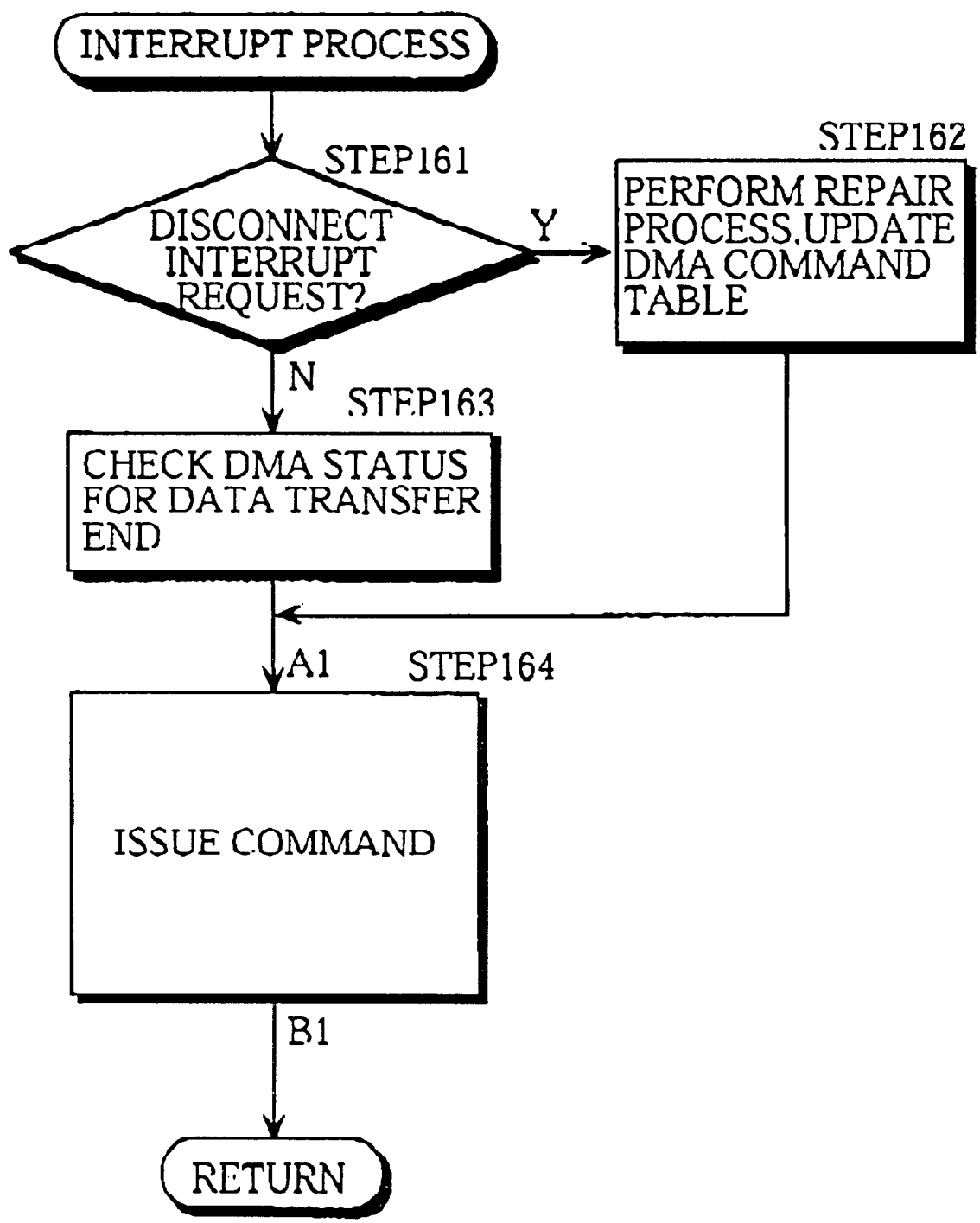
FIG. 16 is a flowchart showing the command issuance process performed by the processor in the interrupt process.

FIG. 16 is a flowchart showing the command issuance processor performed by processor 4 in the interrupt process.

The processor 4, on receiving an interrupt request, judges whether it is the disconnect interrupt request (step 161). If it is, processor 4 performs the repair process and updates the DMA command table (step 162). If judged as negative in step 161, that is, if the interrupt request is the one notifying the end of the execution of a disk command, processor 4 checks the DMA status in disk access unit 3 and ends the current DMA process (step 163).

The processor 4 issues a command from the queue buffer (step 164).

Command Issuance from Queue by Processor 4

Figure 17:
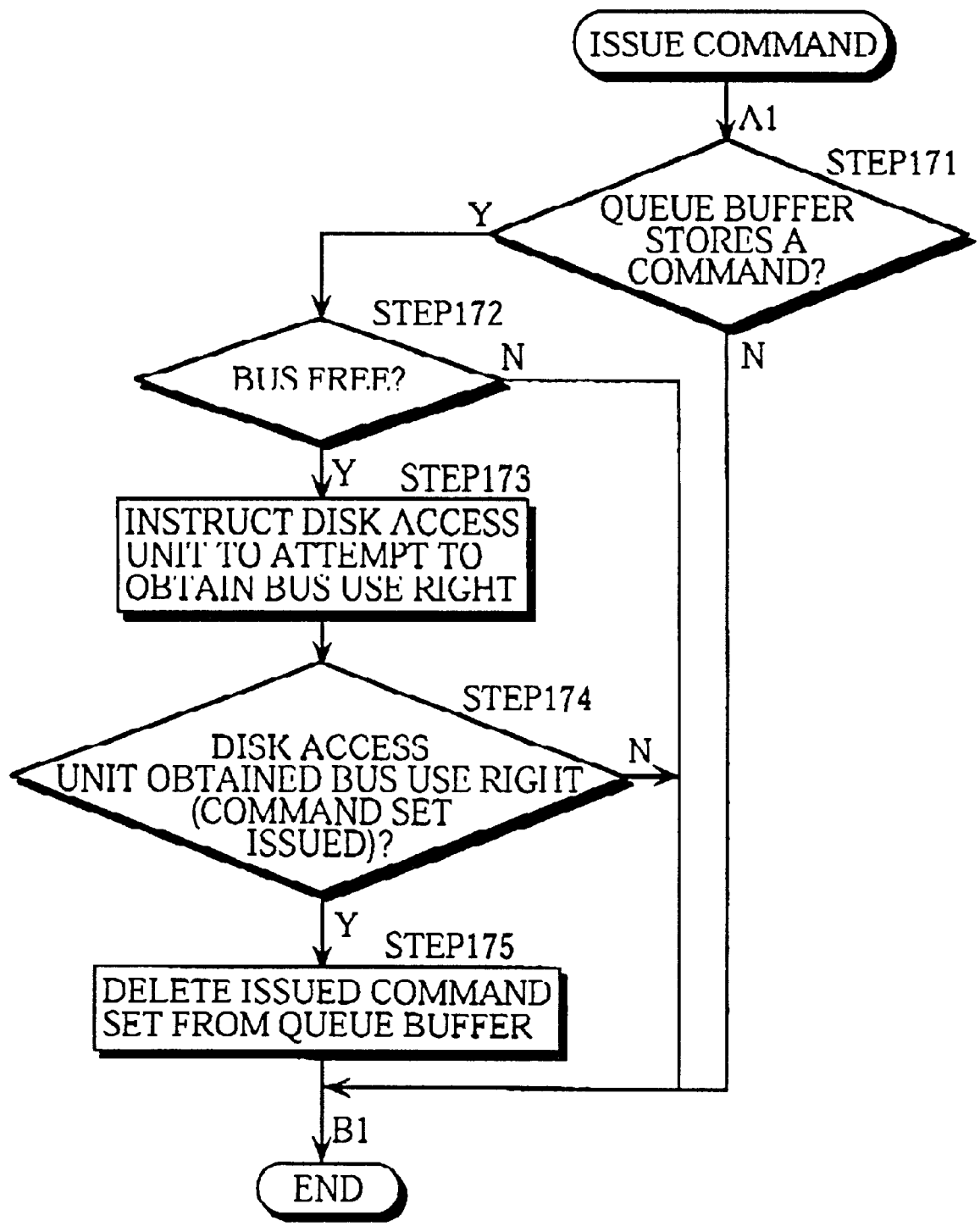
FIG. 17 is a flowchart showing the command issuance process.

FIG. 17 is a detailed flowchart showing the command issuance process performed in step 154 and step 164.

The processor 4 judges whether the queue buffer stores a command (step 171). If includes, processor 4 judges whether the bus is in the bus free state (step 172). If it is, processor 4 instructs disk access unit 3 to participate in the arbitration to attempt to obtain the right for using the bus (step 173). On obtainment of the right for using the bus, processor 4 fetches 1 command set from the queue buffer and issues the command set to disk access unit 3. Here, processor 4 fetches the command set in the FIFO order. The processor 4 judges whether disk access unit 3 has obtained the right or whether a command set has been issued (step 174). If judged as positive, processor 4 deletes the issued command set from the queue buffer.

If it is judged as negative in step 171, step 172, or step 174, processor 4 does not issue a command set and ends the process.

The following is a description of the operation of the data transfer apparatus of the present invention in the present Embodiment.

Figure 18:
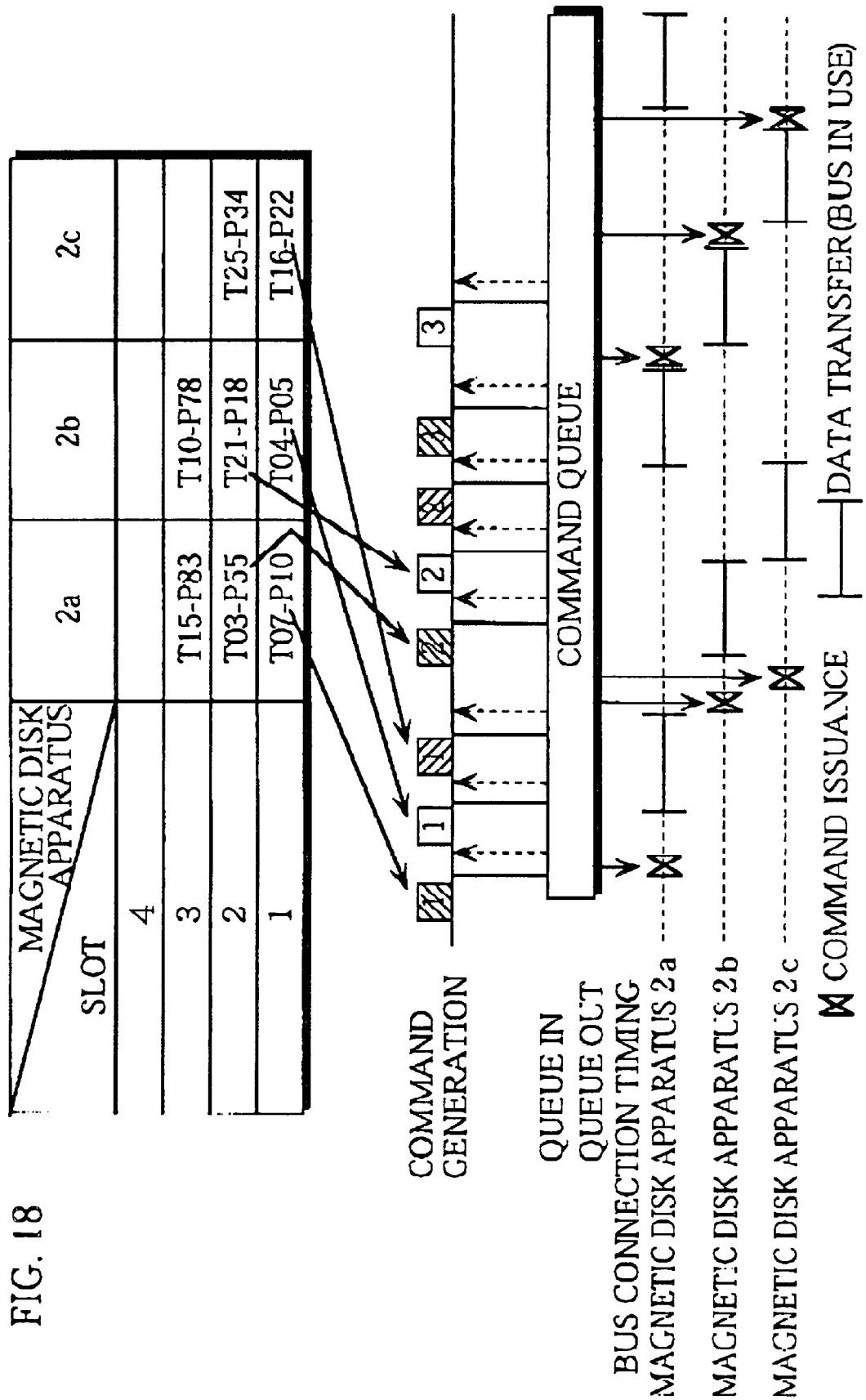
FIG. 18 shows the command issuance timing.

FIG. 18 shows the command issuance timing of the data transfer apparatus of the present Embodiment.

FIG. 18 shows the time slot table, the command set generation timing by processor 4, the command registration (queue in) timing, the command issuance (queue-out) timing, and the data read timing for HDDs 2a–2c during a period in cycle. The processor 4 generates command sets in sequence from the read information in the time slot table as shown in FIG. 15. The command sets are generated and stored in the queue buffer. Therefore, the command sets are always generated before they are issued, regardless of the bus status.

Figure 19:
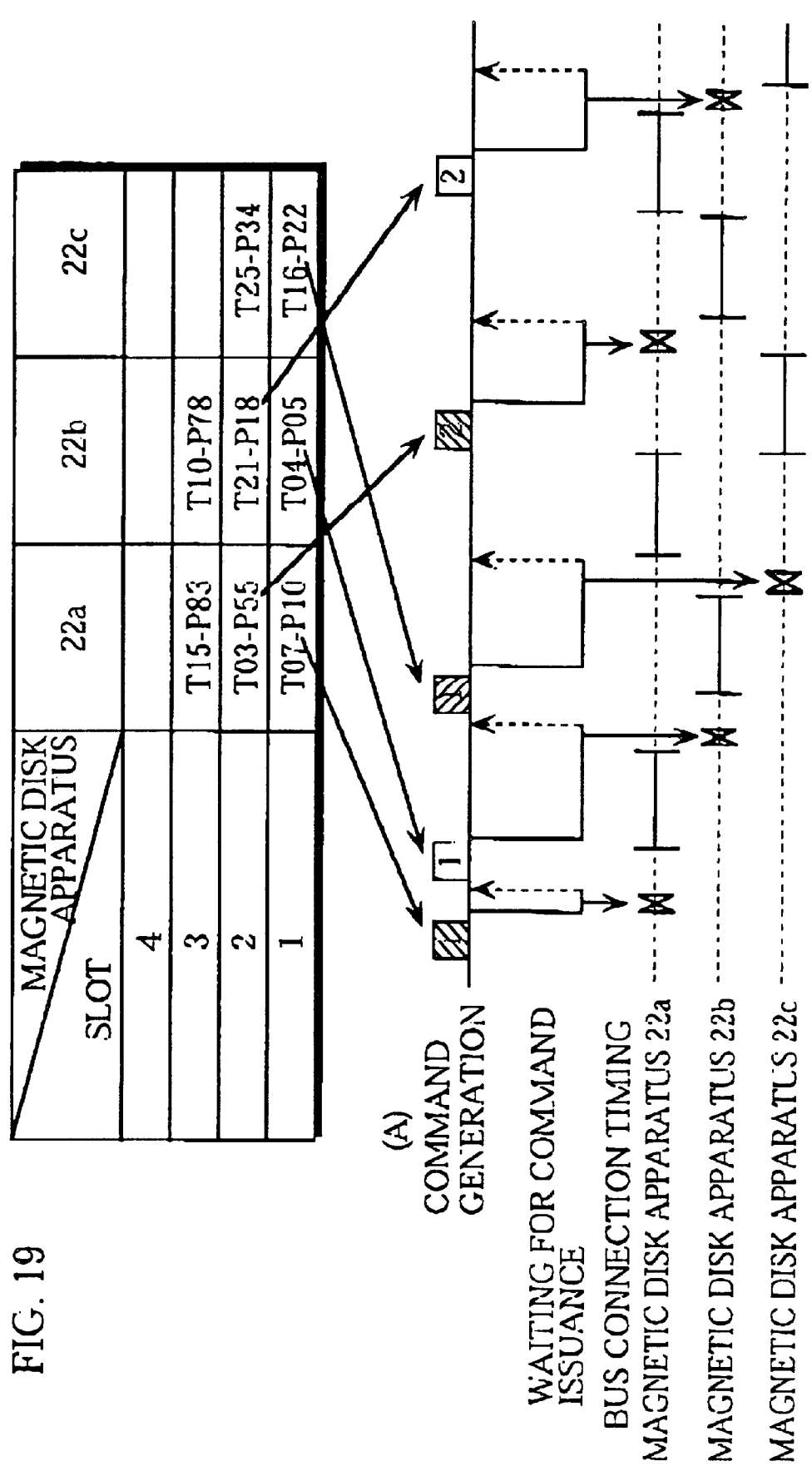
FIG. 19 shows the command issuance timing or the data transfer apparatus of the conventional technique.

FIG. 19 shows the command issuance timing of the data transfer apparatus of the conventional technique. The drawing is provided for showing the difference from the present Embodiment. A comparative study of FIGS. 18 and 19 makes it clear that processor 4 of the present Embodiment, relieved of checking the bus state, issues commands more speedily than the conventional technique. The improved speed of the command issuance is achieved by providing the queue buffer and issuing commands from the queue buffer in the interrupt process (especially, in the disconnect interrupt process). In particular, issuance of commands in the disconnect interrupt process makes it possible to issue a new command immediately after the bus becomes free. This reduces the overhead of processor 4.

Embodiment 3

The data transfer apparatus of the present Embodiment differs from Embodiment 1 in that processor 4 does not use the interrupt process. Otherwise, they are the same. Accordingly, only the difference is described below.

The processor 4 of the present Embodiment detects interrupt request by software, while processor 4 of Embodiment 1 detects interrupt requests by hardware.

Figure 20:
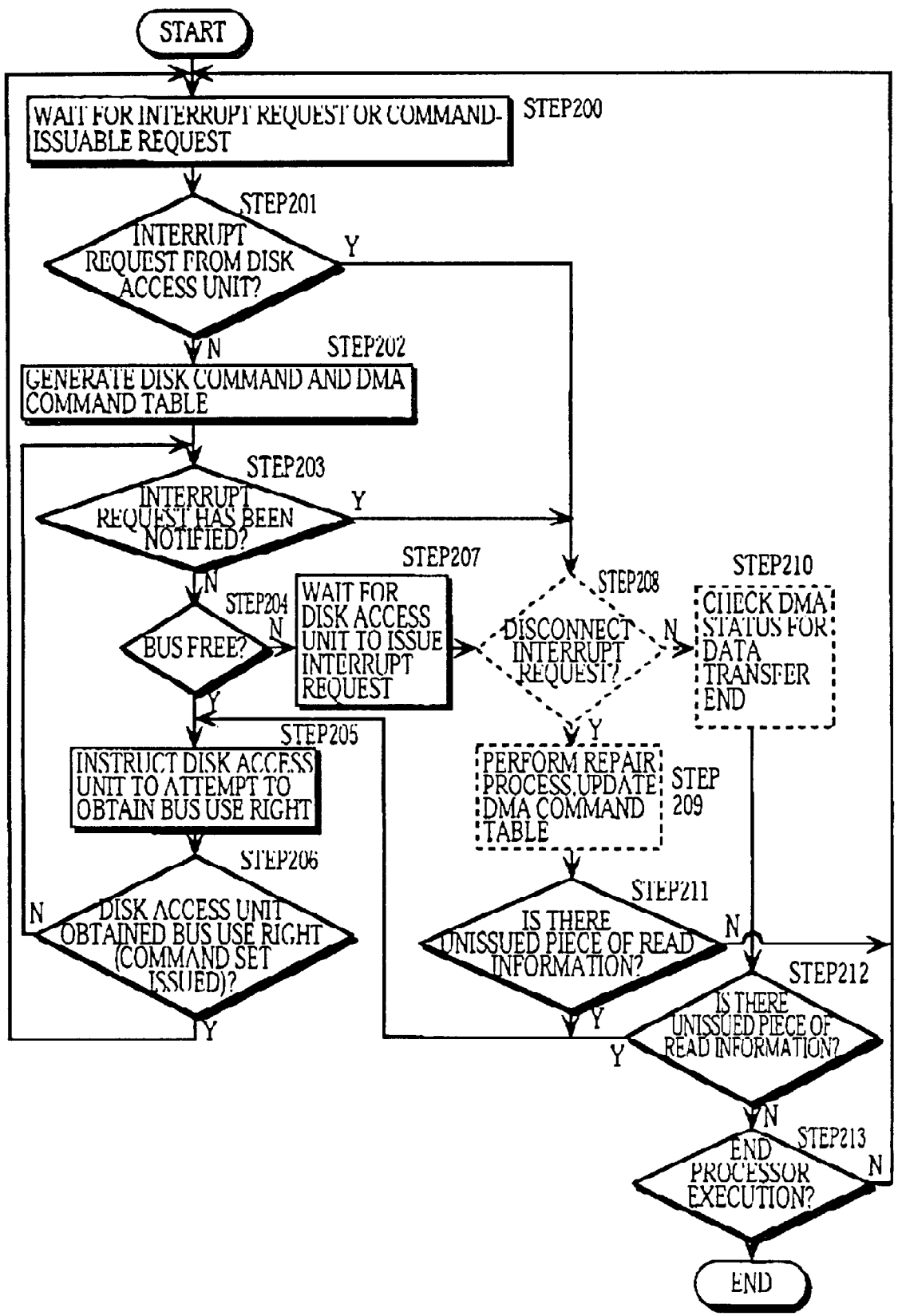
FIG. 20 is a flowchart showing the processes performed by the processor of Embodiment 3.

FIG. 20 is a flowchart showing the processes performed by processor 4 of the present Embodiment. In the drawing, the steps surrounded by dashed lines are performed in Embodiment 1 in the interrupt process. The procedure shown in FIG. 20 differs from that shown in FIGS. 10A and 10B in that the program checks whether an interrupt request has been generated in steps 201, 203, and 207. The other processes are almost the same as those shown in FIGS. 10A and 10B.

With the above construction, the data transfer apparatus of the present Embodiment does not use hardware interrupt requests and eliminates the generation of the table update interrupt request as Embodiment 1 eliminates it.

Embodiment 4

The data transfer apparatus of the present Embodiment differs from Embodiment 2 in that processor 4 does not use the interrupt process. Otherwise, they are the same. Accordingly, only the difference is described below.

The processor 4 of the present Embodiment detects interrupt requests by software, while processor 4 of Embodiment 2 detects interrupt requests by hardware.

Figure 21:
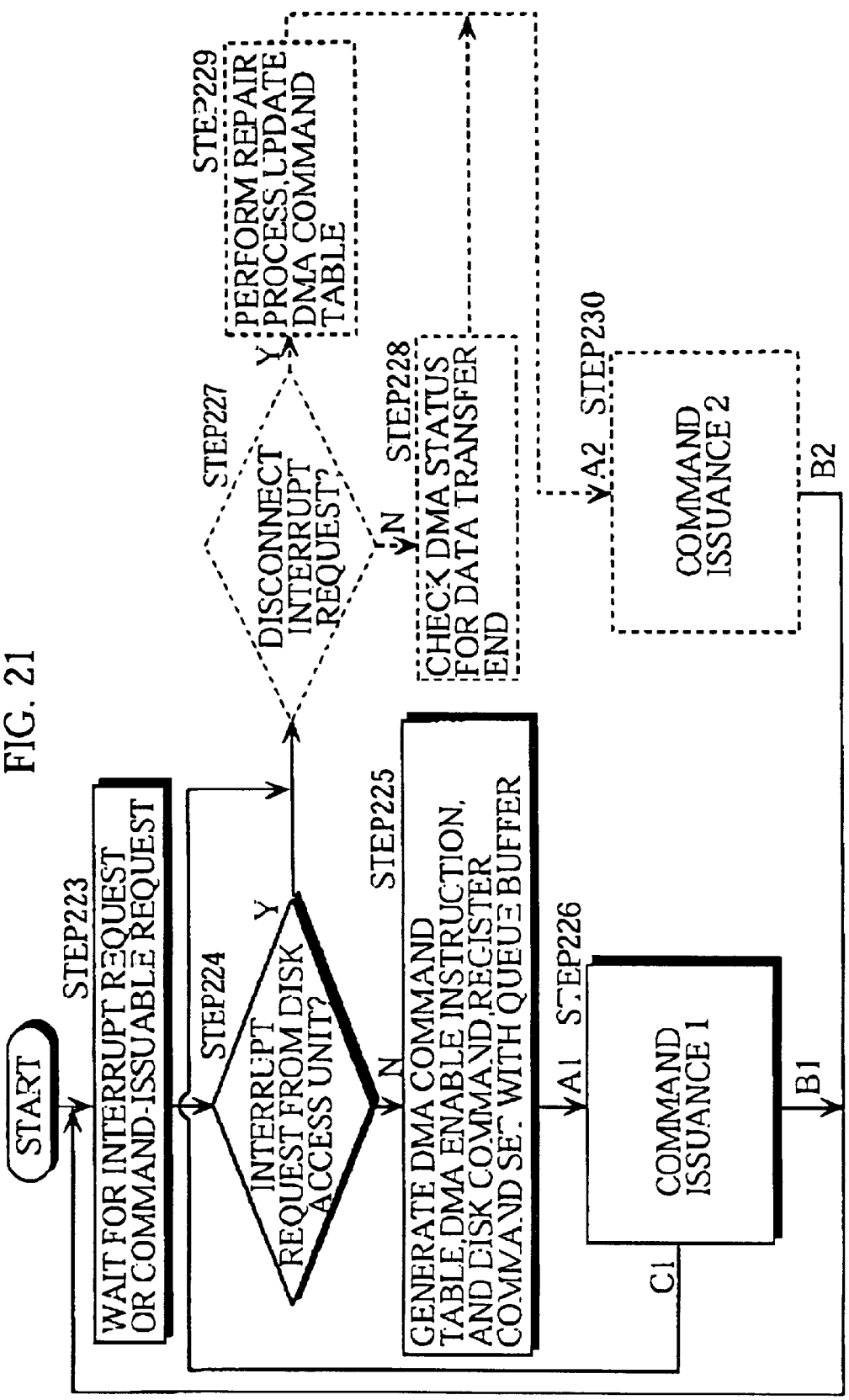
FIG. 21 is a flowchart showing the processes performed by the processor of Embodiment 4.
Figure 22:
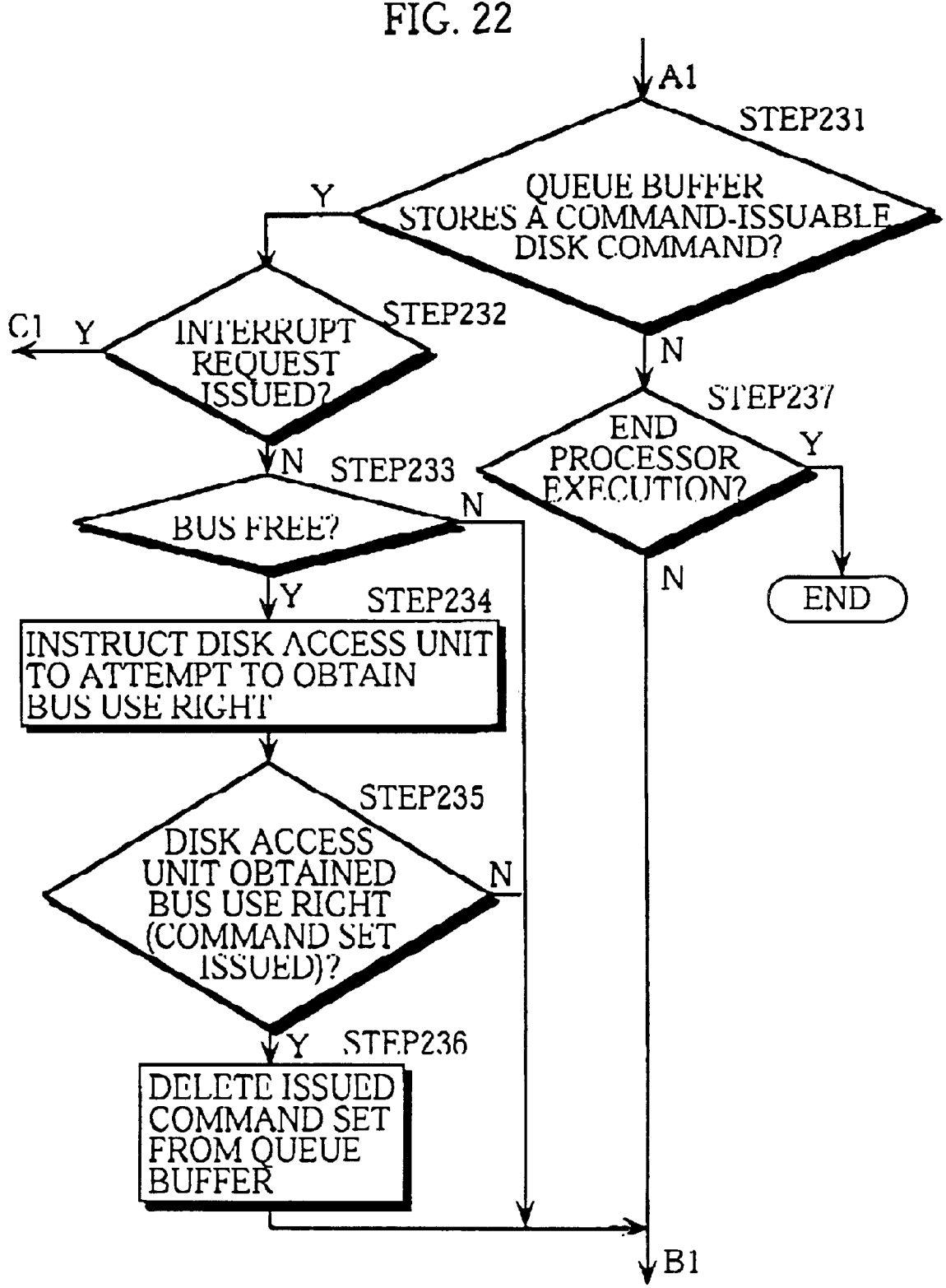
FIG. 22 is a flowchart showing the processes performed by the processor.
Figure 23:
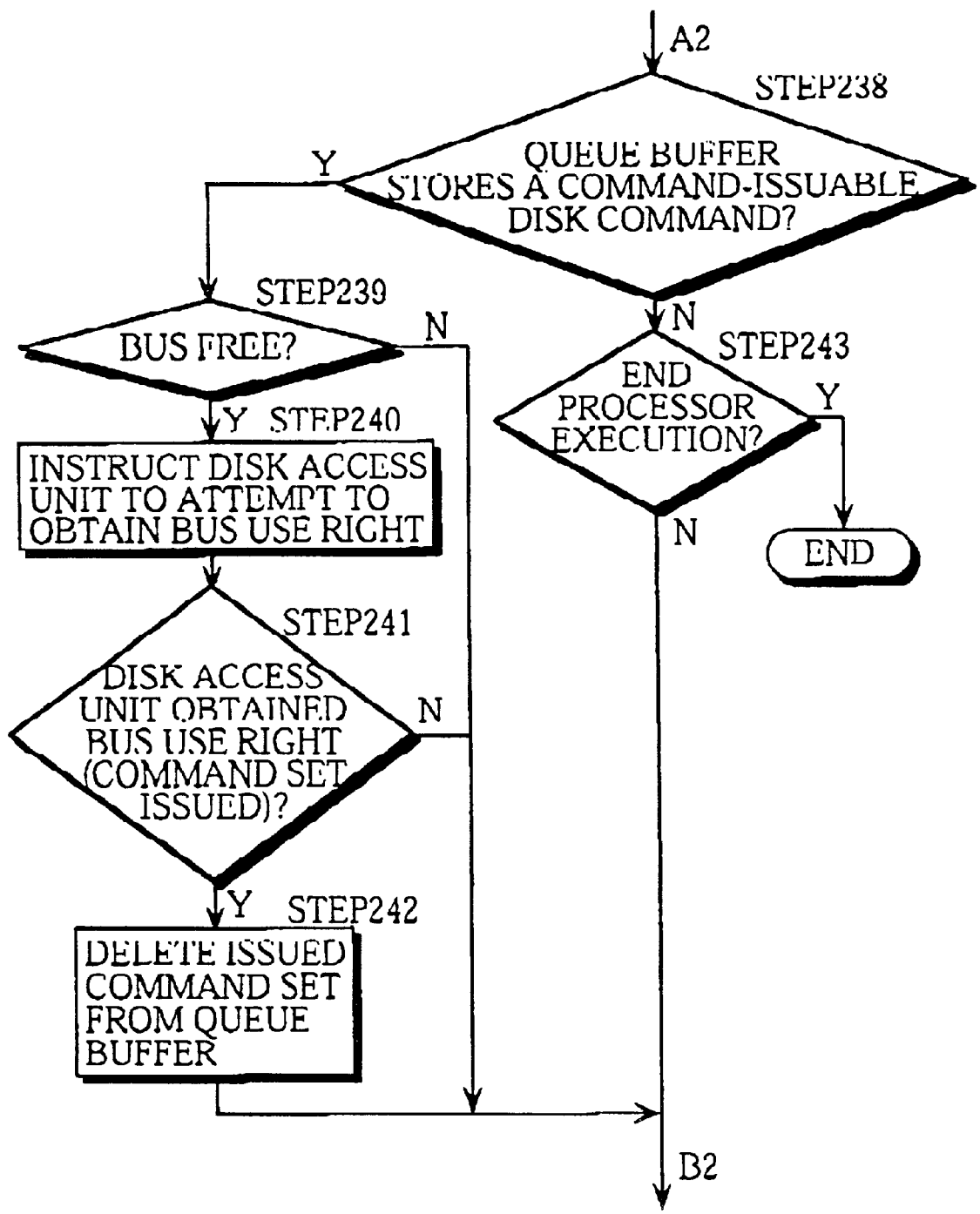
FIG. 23 is a flowchart showing the processes performed by the processor.

FIGS. 21, 22, and 23 are flowcharts showing the processes performed by processor 4 of the present Embodiment. In FIG. 21, the steps surrounded by dashed lines are performed in Embodiment 2 in the interrupt process. The procedure shown these drawings differ from that shown in FIGS. 15, 16, and 17 in that the program checks whether an interrupt request has been generated in steps 223 and 224 of FIG. 21 and step 232 of FIG. 22. The other processes are almost the same.

With the above construction, the data transfer apparatus of the present Embodiment eliminates the generation of the table update interrupt request and reduces the overhead of the processor as Embodiment 3 does, and achieves these without using hardware interrupt requests.

In each of the above Embodiments, when updating the DMA command table, processor 4 shifts the DMA commands having not been executed, in order, in the DMA command table to create a space, then adds new DMA commands to the created space. After a reconnection, disk access unit 3 executes the DMA commands in the table in order starting from the first entry. However, instead of this method, processor 4 may replace only executed DMA commands with new ones and disk access unit 3 may resume the execution starting from the next DMA command to the one which is executed last before the suspension.

In Embodiments 2 and 4, processor 4 fetches command sets from the queue buffer in the FIFO order and issues the fetched command sets. However, the command sets may be issued in other way. That is, when processor 4 cannot issue the command set to a target disk apparatus: processor 4 holds the issuance of the first command set if the next command set is also to be issued to the same disk apparatus; and processor 4 issues the next command set if the next command set is to be issued to another disk apparatus. This method is applied on the assumption that the HDDs do not hold command sets in a queue in the HDDs. If the HDDs in themselves hold command sets in a queue, the above situation need not be considered.

In each of the above Embodiments, storage units with the disconnect function and the reconnect function, such as optical disk drives and magnet-optical disk drives, may be used instead of the HDDs.

The data transfer apparatus of the present invention may be achieved by loading a program, including the flowcharts of one or all of the above Embodiment, into the main memory of a conventional data transfer apparatus. This is because the operation of the data transfer apparatus of each of the above Embodiments is controlled by the processor. In this case, the program may be recorded in a record medium which can be read by the processor in the data transfer apparatus, and the processor may read and write the program into the main memory.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data transfer apparatus for transferring data with a DMA method between a plurality of disk apparatuses and a memory using a DMA command table, wherein the plurality of disk apparatuses are connected to a bus, wherein each of the plurality of disk apparatuses obtains a bus use right for using the bus for a transfer of data, temporarily releases the bus use right depending on an internal state of the disk apparatus, and obtains the bus use right when resuming the transfer of data, the data transfer apparatus comprising:

table generating means for generating the DMA command table which includes an array of a plurality of DMA commands, wherein each of the plurality of DMA commands includes an address of a data area of the memory and a size of a piece of data to be transferred;

transferring means for performing a data transfer between one of the plurality of disk apparatuses and the memory using the DMA command table;

temporary release judging means for judging whether the disk apparatus in the data transfer has temporarily released the bus use right; and table updating means for, when the temporary release judging means judges that the disk apparatus has temporarily released the bus use right, performing a repair process for preserving a current state in preparation for a reconnection, and updating the DMA command table by deleting DMA commands which have been executed and adding new DMA commands so that the disk apparatus resumes the data transfer.

2. The data transfer apparatus of claim 1, wherein the table generating means generates the DMA command table so that a total of sizes specified in the plurality of DMA commands in the DMA command table is equal to a first data size, wherein the first data size is greater than or equal to a second data size which is a maximum amount of data to be transferred in succession by each of the plurality of disk apparatuses without temporary releasing the bus use right.

3. The data transfer apparatus of claim 2, wherein each of the plurality of disk apparatuses includes an internal buffer and transmits data from the internal buffer to the bus and concurrently, writes data from a disk into the internal buffer, wherein the first data size satisfies a formula:

$$S\_trans \geq \Sigma^n((B\_inner/B\_bus)^{n-1} * S\_inner\_buff),$$

wherein "$S\_trans$" represents the first data size, "$B\_inner$" represents a data transfer speed in each of the plurality of disk apparatuses of transferring data from the disk to the internal buffer, "B_bus" represents a data transfer speed of the bus, "S inner_buff" represents a capacity of the internal buffer, and n represents integers 1 and greater.

4. The data transfer apparatus of claim 1 further comprising:
   command generating means for generating a certain number or less of disk commands for each of the plurality of disk apparatuses in a certain cycle, the disk command specifying one of data reading and data writing;
   queue holding means for holding disk commands generated by the command generating means in a queue; and
   command issuing means for, when the temporary release judging means judges that the disk apparatus has temporarily released the bus use right, fetching a disk command from the queue and issuing the fetched disk command to another disk apparatus, wherein
      the transferring means starts a data transfer between the other disk apparatus and the memory when the other disk apparatus receives the disk command from the command issuing means and resumes the data transfer when the disk apparatus having temporarily released the bus use right obtains the bus use right.

5. The data transfer apparatus of claim 4, wherein
   the table generating means generates the DMA command table so that a total of sizes specified in the plurality of DMA commands in the DMA command table is equal to a first data size, wherein the first data size is greater than or equal to a second data size which is a maximum amount of data to be transferred in succession by each of the plurality of disk apparatuses without temporary releasing the bus use right.

6. The data transfer apparatus of claim 5, wherein
   each of the plurality of disk apparatuses includes an internal buffer and transmits data from the internal buffer to the bus and concurrently, writes data from a disk into the internal buffer, wherein
      the first data size satisfies a formula:

$$S\_trans \geq \Sigma^n((B\_inner/B\_bus)^{n-1} * S\_inner\_buff),$$

wherein "S_trans" represents the first data size, "B_inner" represents a data transfer speed in each of the plurality of disk apparatuses of transferring data from the disk to the internal buffer, "B_bus" represents a data transfer speed of the bus, "S inner_buff" represents a capacity of the internal buffer, and n represents integers 1 and greater.

7. A data transfer apparatus for transferring data with a DMA method between a plurality of disk apparatuses and a memory using a DMA command table, wherein the plurality of disk apparatuses are connected to a bus, wherein each of the plurality of disk apparatuses obtains a bus use right for using the bus for a transfer of data, temporarily releases the bus use right depending on an internal state of the disk apparatus, and obtains the bus use right when resuming the transfer of data, the data transfer apparatus comprising:
   table generating means for generating the DMA command table which includes an array of a certain number of DMA commands, wherein each of the certain number of DMA commands includes an address of a data area of the memory and a size of a piece of data to be transferred;
   disk command generating means for generating a certain number or less of disk commands for each of the plurality of disk apparatuses in a certain cycle, the disk command specifying a certain amount of one of data reading and data writing;
   transferring means for performing a data transfer between one of the plurality of disk apparatuses and the memory using the DMA command table;
   temporary release judging means for judging whether the disk apparatus in the data transfer has temporarily released the bus use right; and
   table updating means for, when the temporary release judging means judges that the disk apparatus has temporarily released the bus use right, performing a repair process for preserving a current state in preparation for a reconnection, and updating the DMA command table, so that the disk apparatus resumes the data transfer, by deleting DMA commands which have been executed and one of adding new DMA commands so that a number of DMA commands in the DMA command table becomes equivalent to the certain number and adding new DMA commands so that a total of sizes specified in DMA commands having been executed and sizes specified in DMA commands currently stored in the DMA command table is equal to the certain amount specified in the disk command.

8. The data transfer apparatus of claim 7, wherein
   the table generating means generates the DMA command table so that a total of sizes specified in the certain number of DMA commands in the DMA command table is equal to a first data size, wherein the first data size is greater than or equal to a second data size which is a maximum amount of data to be transferred in succession by each of the plurality of disk apparatuses without temporary releasing the bus use right.

9. The data transfer apparatus of claim 8, wherein
   each of the plurality of disk apparatuses includes an internal buffer and transmits data from the internal buffer to the bus and concurrently, writes data from a disk into the internal buffer, wherein
      the first data size satisfies a formula:

$$S\_trans \geq \Sigma^n((B\_inner/B\_bus)^{n-1} * S\_inner\_buff),$$

wherein "S trans" represents the first data size, "B_inner" represents a data transfer speed in each of the plurality of disk apparatuses of transferring data from the disk to the internal buffer, "B_bus" represents a data transfer speed of the bus, "S inner_buff" represents a capacity of the internal buffer, and n represents integers 1 and greater.

10. The data transfer apparatus of claim 7 further comprising:
   queue holding means for holding disk commands generated by the disk command generating means in a queue; and
   command issuing means for, when the temporary release judging means judges that the disk apparatus has temporarily released the bus use right, fetching a disk command from the queue and issuing the fetched disk command to another disk apparatus, wherein
      the transferring means starts a data transfer between the other disk apparatus and the memory when the other disk apparatus receives the disk command from the command issuing means and resumes the data transfer when the disk apparatus having temporarily released the bus use right obtains the bus use right.

11. The data transfer apparatus of claim 10, wherein the table generating means generates the DMA command table so that a total of sizes specified in the certain number of DMA commands in the DMA command table is equal to a first data size, wherein the first data size is greater than or equal to a second data size which is a maximum amount of data to be transferred in succession by each of the plurality of disk apparatuses without temporary releasing the bus use right.

12. The data transfer apparatus of claim 11, wherein each of the plurality of disk apparatuses includes an internal buffer and transmits data from the internal buffer to the bus and concurrently, writes data from a disk into the internal buffer, wherein the first data size satisfies a formula:

$$S\_trans \geq \Sigma^n((B\_inner/B\_bus)^{n-1} * S\_inner\_buff),$$

wherein "S_trans" represents the first data size, "B_inner" represents a data transfer speed in each of the plurality of disk apparatuses of transferring data from the disk to the internal buffer, "B_bus" represents a data transfer speed of the bus, "S inner_buff" represents a capacity of the internal buffer, and n represents integers 1 and greater.

13. A record medium storing a program which is executed by a processor in a data transfer apparatus which includes a processor, a memory, a plurality of disk apparatuses and a disk controlling unit, the plurality of disk apparatuses being connected to a bus, wherein:

the disk controlling unit controls reading data from the plurality of disk apparatuses, controls writing data into the plurality of disk apparatuses, and controls DMA data transfer between the plurality of disk apparatuses and the memory using a DMA command table, wherein:

each of the plurality of disk apparatuses obtains a bus use right for using the bus for transfer of data, temporarily releases the bus use right depending on an internal state of the disk apparatus, and obtains the bus use right when resuming the transfer of data, the program stored in the record medium providing:

table generating means for generating the DMA command table in the memory, the DMA command table including an array of a certain number of DMA commands, wherein each of the certain number of DMA commands includes an address of a data area of the memory and a size of a piece of data to be transferred;

disk command generating means for generating a certain number or less of disk commands for each of the plurality of disk apparatuses in a certain cycle, the disk command specifying a certain amount of one of data reading and data writing;

transferring means for activating the disk controlling unit to perform the certain amount of one of data reading and data writing from and into the disk apparatus using the DMA command table;

temporary release judging means for judging whether the disk apparatus in the data transfer has temporarily released the bus use right; and table updating means for, when the temporary release judging means judges that the disk apparatus has temporarily released the bus use right, performing a repair process for preserving a current state in preparation for a reconnection, and updating the DMA command table as an interrupt process, so that the disk apparatus resumes the data transfer, by deleting DMA commands which have been executed and one of adding new DMA commands so that a number of DMA commands in the DMA command table becomes equivalent to the certain number and adding new DMA commands so that a total of sizes specified in DMA commands having been executed and sizes specified in DMA commands currently stored in the DMA command table is equal to the certain amount specified in the disk command.

14. The record medium of claim 13, wherein the table generating means generates the DMA command table so that a total of sizes specified in the certain number of DMA commands in the DMA command table is equal to a first data size, wherein the first data size is greater than or equal to a second data size which is a maximum amount of data to be transferred in succession by each of the plurality of disk apparatuses without temporary releasing the bus use right.

15. The record medium of claim 14, wherein each of the plurality of disk apparatuses includes an internal buffer and transmits data from the internal buffer to the bus and concurrently, writes data from a disk into the internal buffer, wherein the first data size satisfies a formula:

$$S\_trans \geq \Sigma^n((B\ inner/B\_bus)^{n-1} * S\_inner\_buff),$$

wherein "S_trans" represents the first data size, "B_inner" represents a data transfer speed in each of the plurality of disk apparatuses of transferring data from the disk to the internal buffer, "B_bus" represents a data transfer speed of the bus, "S inner_buff" represents a capacity of the internal buffer, and n represents integers 1 and greater.

16. The record medium of claim 13 further comprising:

queue holding means for holding disk command generates by the disk command generating means in a queue; and command issuing means for, when the temporary release judging means judges that the disk apparatus has temporarily released the bus use right, fetching a disk command from the queue and issuing the fetched disk command to another disk apparatus, wherein the transferring means starts a data transfer between the other disk apparatus and the memory when the other disk apparatus receives the disk command from the command issuing means and resumes the data transfer when the disk apparatus having temporarily released the bus use right obtains the bus use right.

17. The record medium of claim 16, wherein the table generating means generates the DMA command table so that a total of sizes specified in the certain number of DMA commands in the DMA command table is equal to a first data size, wherein the first data size is greater than or equal to a second data size which is a maximum amount of data to be transferred in succession by each of the plurality of disk apparatuses without temporary releasing the bus use right.

18. The record medium of claim 17, wherein each of the plurality of disk apparatuses includes an internal buffer and transmits data from the internal buffer to the bus and concurrently, writes data from a disk into the internal buffer, wherein the first data size satisfies a formula:

$$S\_trans \geq \Sigma^n((B\_inner/B\_bus)^{n-1} * S\_inner\_buff),$$

wherein "S_trans" represents the first data size, "B_inner" represents a data transfer speed in each of the plurality of disk apparatuses of transferring data from the disk to the internal buffer, "B_bus" represents a data transfer speed of the bus, "S inner_buff" represents a capacity of the internal buffer, and n represents integers 1 and greater.

19. A method for transferring data between a plurality of disk apparatuses and a memory using a DMA command table, wherein the plurality of disk apparatuses are connected to a bus, wherein each of the plurality of disk apparatuses obtains a bus use right for using the bus for a transfer of data, temporarily releases the bus use right depending on an internal state of the disk apparatus, and obtains the bus use right when resuming the transfer of data, the method comprising:

generating a DMA command table which includes an array of a plurality of DMA commands, wherein each of the plurality of DMA commands includes an address of a data area of the memory and a size of a piece of data to be transferred;

performing a data transfer between one of the plurality of disk apparatuses and the memory using the DMA command table; and updating the DMA command table before the DMA command table becomes empty in response to a determination that the disk apparatus involved in said data transfer has temporarily released the bus use right.

20. The method of claim 19 wherein said step of updating includes updating the DMA command table by deleting DMA commands which have been executed and adding new DMA commands so that the disk apparatus resumes the data transfer.

21. The method of claim 20 further including the step of performing a repair process for preserving a current state in preparation for a reconnection in response to said determination.

* * * * *